(12) United States Patent
McIntosh et al.

(10) Patent No.: US 7,150,563 B2
(45) Date of Patent: Dec. 19, 2006

(54) FORMABLE BEARINGS AND BEARING DEVICES

(75) Inventors: Bruce D. McIntosh, Monroeville, IN (US); Kenneth A. Steele, Fort Wayne, IN (US); Clinton L. Alexander, Fort Wayne, IN (US); William E. Davenport, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 95 days.

(21) Appl. No.: 10/845,696

(22) Filed: May 14, 2004

(65) Prior Publication Data

US 2004/0252922 A1    Dec. 16, 2004

Related U.S. Application Data

(60) Provisional application No. 60/470,747, filed on May 15, 2003.

(51) Int. Cl.
*F16C 29/02* (2006.01)
*B65H 9/06* (2006.01)

(52) U.S. Cl. ........................................ 384/42; 271/245

(58) Field of Classification Search ............... 384/7, 384/10, 26, 37, 41, 42; 271/245, 246, 220–222; 198/345.1, 345.2
See application file for complete search history.

(56) References Cited

U.S. PATENT DOCUMENTS

| | | | | |
|---|---|---|---|---|
| 2,626,147 | A | * 1/1953 | Gjostein | 271/8.1 |
| 3,061,887 | A | * 11/1962 | Clarke | 29/898.03 |
| 3,591,669 | A | 7/1971 | Membry | |
| 3,734,660 | A | 5/1973 | Davies et al. | |
| 3,786,543 | A | 1/1974 | Sato | |
| 4,137,618 | A | 2/1979 | Krauss | |
| 4,381,589 | A | 5/1983 | Cope | |
| 4,875,263 | A | * 10/1989 | Furumura | 384/297 |
| 5,120,279 | A | 6/1992 | Rabe | |
| 5,328,273 | A | 7/1994 | Nonaka et al. | |
| 5,596,805 | A | 1/1997 | Kunze et al. | |
| 5,676,484 | A | 10/1997 | Chamberlin et al. | |
| 5,755,516 | A | 5/1998 | Teramachi et al. | |
| 5,885,005 | A | 3/1999 | Nakano et al. | |
| 5,915,842 | A | 6/1999 | Redinger | |
| 6,085,420 | A | 7/2000 | Konomoto | |
| 6,193,417 | B1 | 2/2001 | Brandenstein et al. | |
| 6,203,200 | B1 | 3/2001 | Teramachi | |
| 6,315,451 | B1 | * 11/2001 | Michioka et al. | 384/42 |
| 6,377,770 | B1 | 4/2002 | Hirose et al. | |
| 2002/0025095 | A1 | 2/2002 | Brandenstein et al. | |
| 2002/0112351 | A1 | 8/2002 | Michioka et al. | |

* cited by examiner

*Primary Examiner*—Thomas R. Hannon
(74) *Attorney, Agent, or Firm*—Barnes & Thornburg LLP

(57) ABSTRACT

A formed bearing assembly and a method of making the bearing is provided. The bearing assembly includes a housing and a bearing space formed therein. A slide is disposed within the bearing space and is movable along its longitudinal extent. A bearing is formed in the bearing space between the housing and the slide. The bearing is a solid, formed in the bearing space while in liquid state. At least a portion of the bearing forms the shape of at least a portion of the slide.

20 Claims, 25 Drawing Sheets

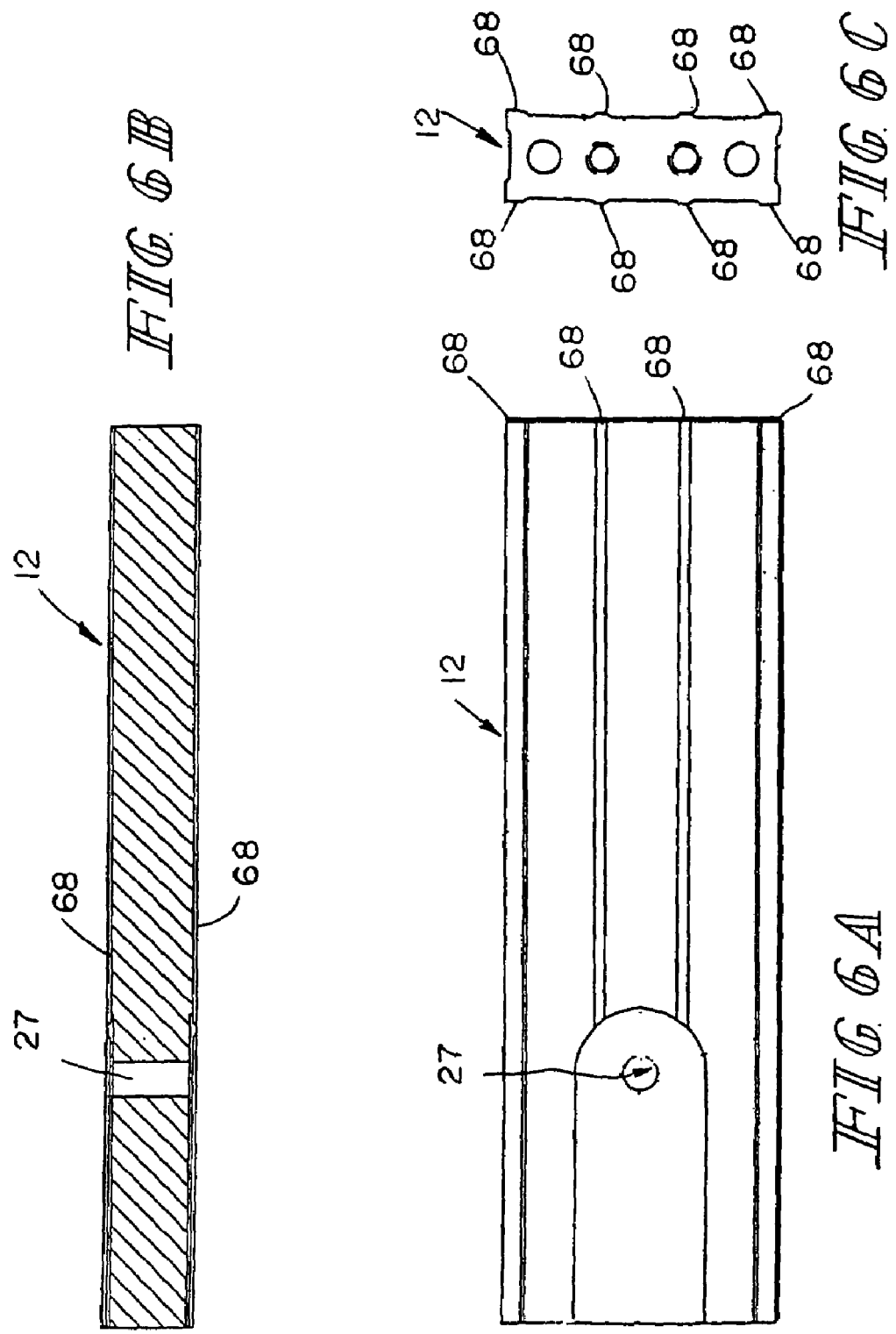

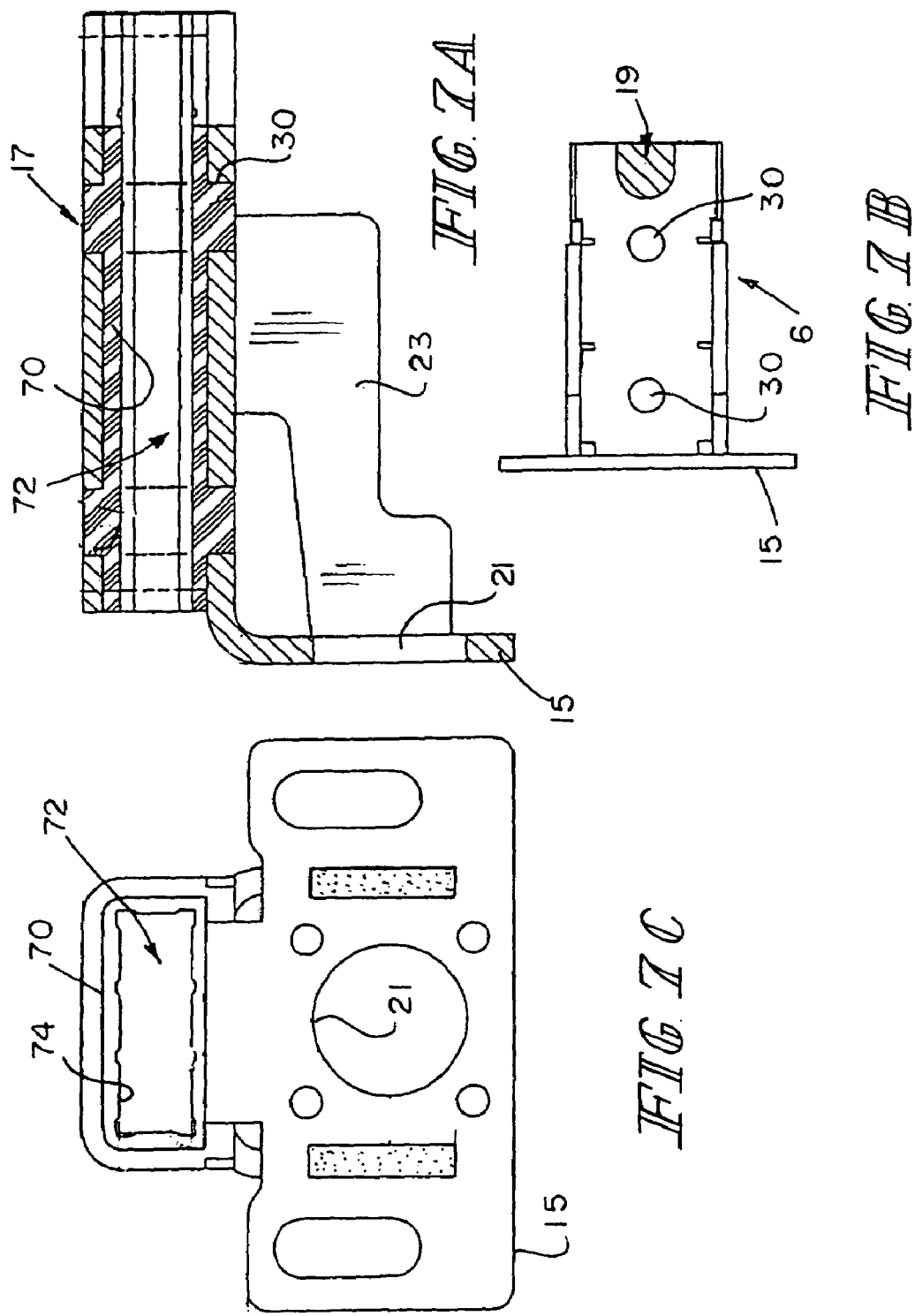

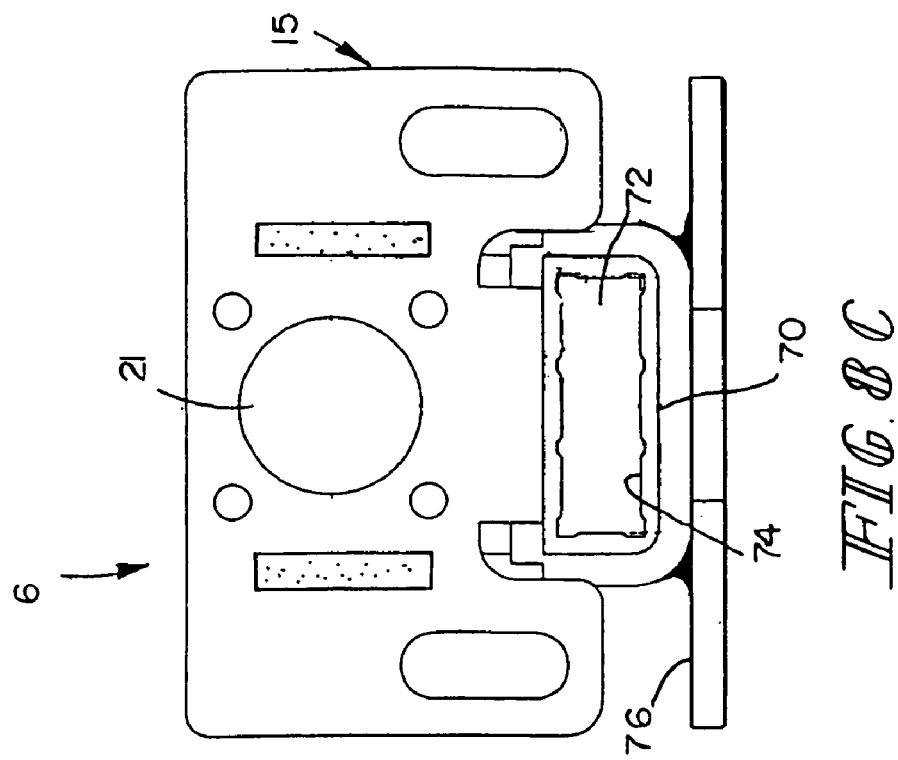
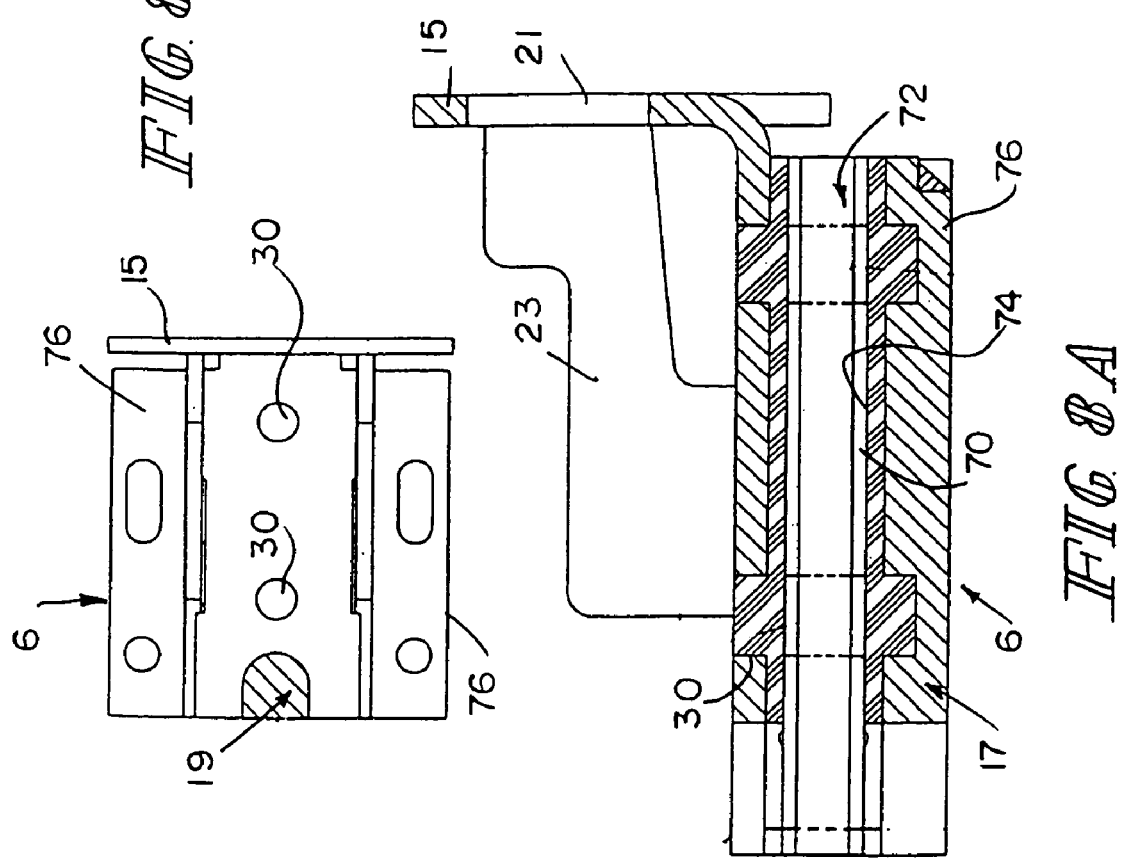

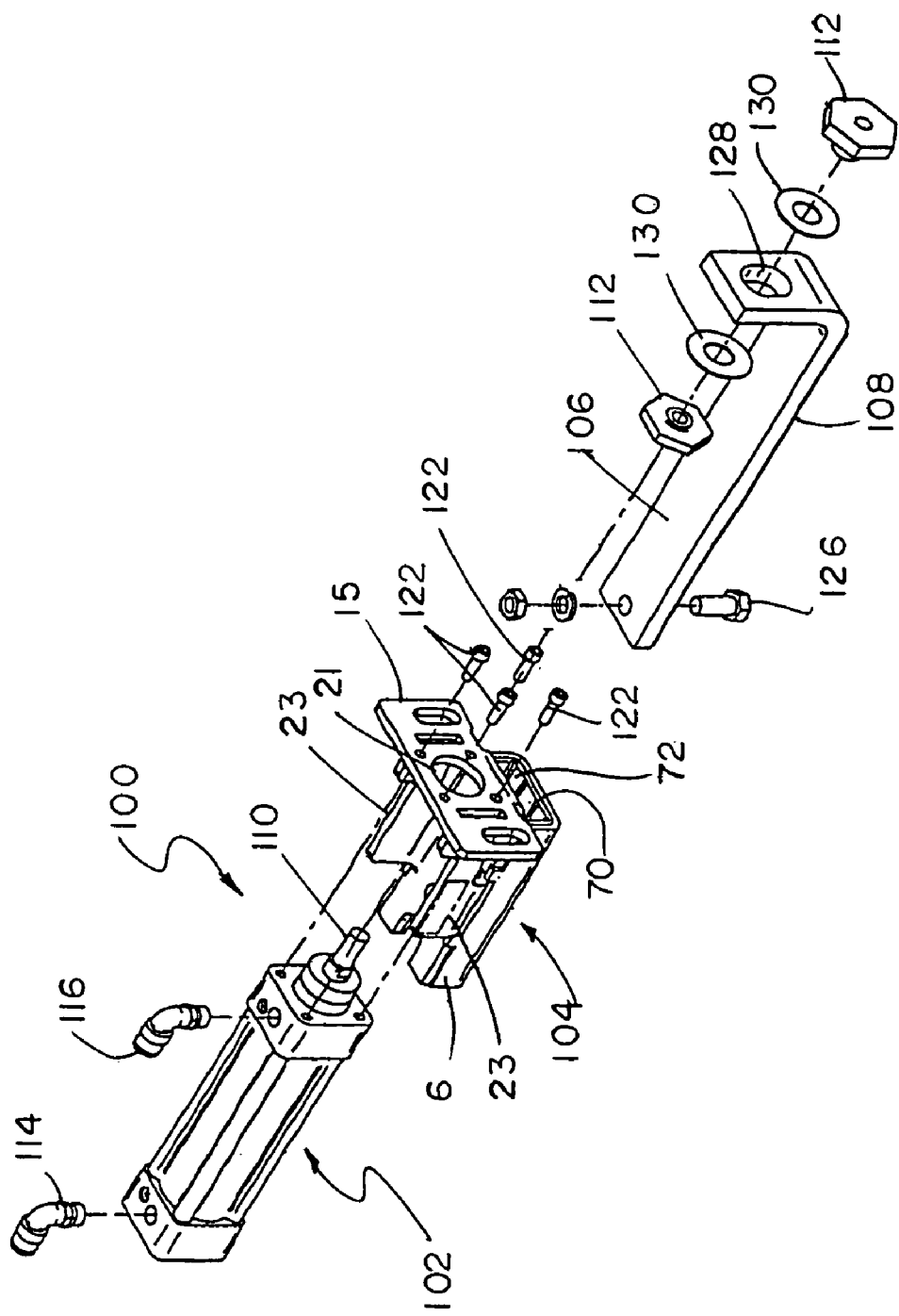

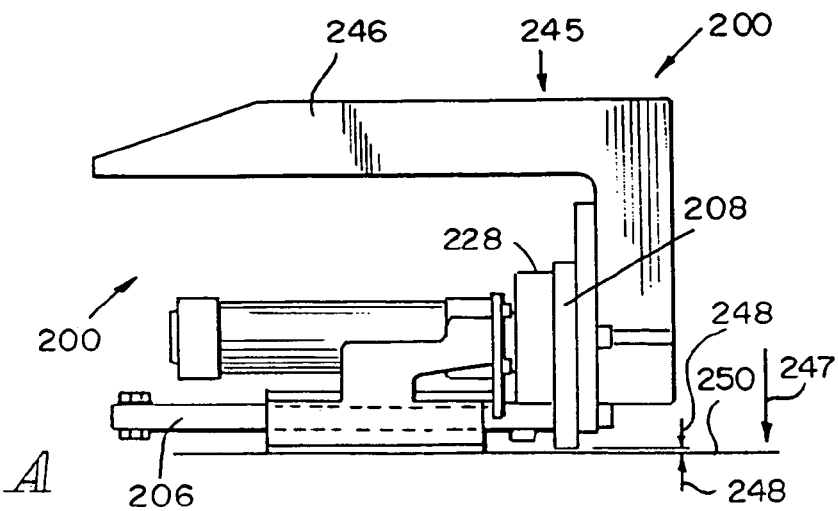
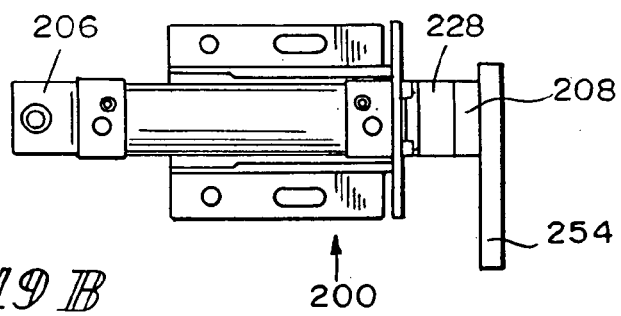
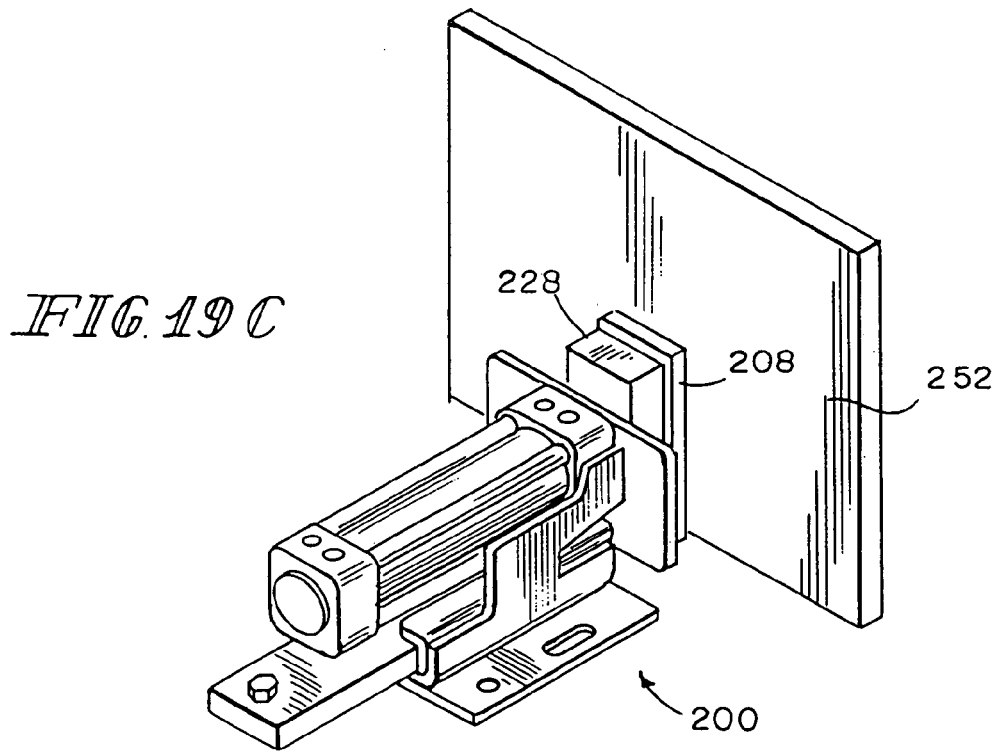

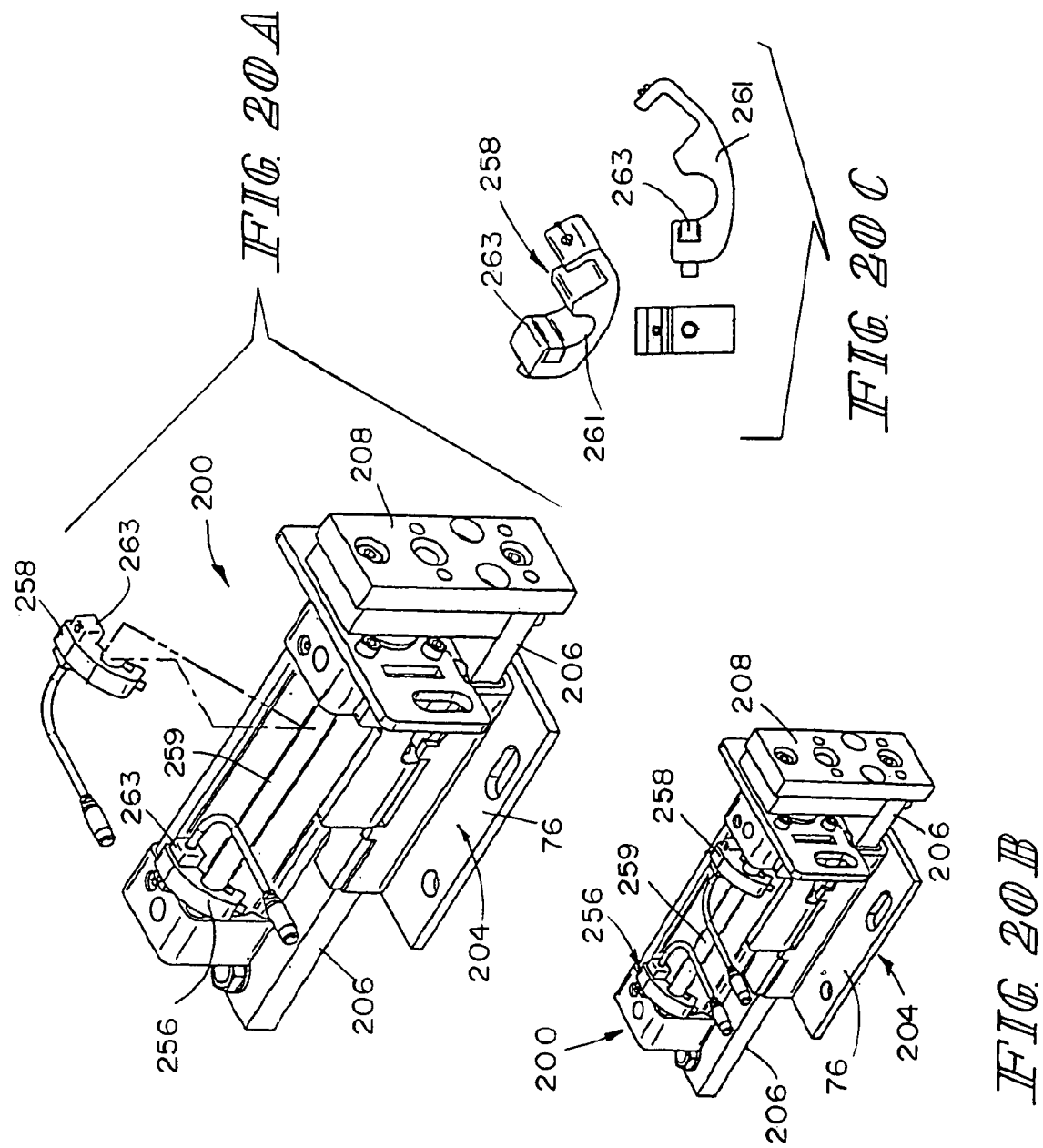

FORMABLE BEARINGS AND BEARING DEVICES

RELATED APPLICATIONS

The present application is related to and claims priority to U.S. Provisional Patent Application, Ser. No. 60/470,747, filed on May 15, 2003, entitled Formable Bearings and Bearing Devices. The subject matter disclosed in that provisional application is hereby expressly incorporated into the present application.

TECHNICAL FIELD

The present disclosure relates to bearing devices and methods of making the same. More particularly, the present disclosure is related to slide devices and methods of making the same that employ formable bearings.

BACKGROUND AND SUMMARY

Conventional slide devices typically require a precise bore formed within a housing, along with equally precise machined bearings inserted into that bore. Such precise sizing and alignment required between the housing, bearing, and ultimately the slide, increases the cost of the device. Furthermore, the bearings on such devices tend to be delicate and typically cannot withstand constant impact forces being exerted there against, without experiencing a deleterious effect.

Accordingly, an illustrative embodiment of the present disclosure provides a formed bearing assembly. The bearing assembly comprises a housing, a slide, and a bearing. Illustratively, the housing has a longitudinal extent and a bearing space formed along the longitudinal extent. The slide is disposed within the bearing space of the housing, and is movable along its longitudinal extent. The bearing is formed in the bearing space between the housing and the slide. At least a portion of the bearing forms the contour of at least a portion of the slide which is movable there along. The bearing is a solid, formed in the bearing space while in liquid state.

In the above and other embodiments, the bearing assembly may further comprise: an impact member attached to the slide; a bearing configured to receive an impact force external of the housing; a resilient bearing; a housing comprising at least one opening to receive a portion of a bearing when in liquid state to assist securing the bearing to the housing; an impact member comprising an impact surface configured to receive an impact force; an impact surface oriented in tandem with at least a portion of a bearing and wherein the bearing is configured to receive an impact force; and an impact surface oriented askew to at least a portion of a bearing and wherein the bearing is configured to receive an impact force.

Another illustrative embodiment of the present disclosure provides a formed slide bearing assembly. The assembly comprises a housing, a slide, and a bearing. The housing has a longitudinal extent and has a bearing space formed along the longitudinal extent. The slide is disposed within the bearing space of the housing and is movable along its longitudinal extent. The bearing is formed in the bearing space between the housing and the slide. At least a portion of the bearing forms the contour of at least a portion of the slide which is movable there along. The bearing is a resilient material, and is configured to mitigate the effects of an impact force exerted on the slide.

In the above and other embodiments, the bearing assembly may further comprise: an impact member attached to the slide; an impact member comprising an impact surface configured to receive an impact force; an impact surface being oriented in tandem with at least a portion of the bearing and the bearing being configured to receive the impact force; and an impact surface being oriented askew to at least a portion of a bearing configured to receive the impact force.

Another illustrative embodiment of the present disclosure provides a method of making a slide formable bearing assembly. The method comprises: providing a housing having a bearing space formed therein; disposing a core in the bearing space; disposing liquid bearing material in the bearing space between the core and the housing; allowing solidification of the bearing material; removing the core exposing a cavity; and inserting a movable member into the cavity.

In the above and other embodiments, the method may further comprise the step or steps of: attaching a movable member to an actuator; attaching the housing to a guide assembly; providing a guide assembly comprising a base back plate; attaching a core guide to the core; providing a space configured to receive the core guide to locate the core in the bearing space; providing a space in the housing to receive liquid bearing material; providing a wall in the housing with an opening disposed therethrough to receive bearing material; sealing the wall during the disposition of the liquid bearing material in the bearing space; securing the housing to the base during the disposition of the liquid bearing material in the bearing space; securing the housing to the back plate during the disposition of the liquid bearing material in the bearing space; coupling the housing to a slide assembly; coupling the housing to an actuator; coupling the housing to a cylinder actuator; and coupling the housing to a pneumatic actuator.

Another illustrative embodiment of the present disclosure provides an impact assembly. The assembly comprises a housing, a slide, a bearing, and an impact member. The housing has a longitudinal extent and has a bearing space formed along the longitudinal extent. The slide is disposed within the bearing space of the housing, and is movable along its longitudinal extent. The bearing is formed in the bearing space between the housing and the slide. The impact plate is coupled to the slide, and is configured to receive an impact member. An impact against the impact member causes the slide to exert a force against the bearing. The bearing is configured to absorb the force from the slide.

In the above and other embodiments, the impact assembly may further comprise: an impact plate being oriented in tandem with at least a portion of the bearing; an impact member being oriented askew to at least a portion of the bearing; an impact member being oriented in tandem with at least a portion of the slide; an impact member being attached to the slide; an impact member being formed integral with the slide; an impact member being oriented in tandem with at least a portion of the slide and at least a portion of the bearing wherein the force of the impact is directed to the bearing; an actuator being attached to the housing; and an actuator being attached to the slide to move the slide relative to the housing.

Additional features and advantages of the method of forming the bearings and the bearing devices will become apparent to those skilled in the art upon consideration of the following detailed descriptions exemplifying the best mode of carrying out these methods and devices as presently perceived.

BRIEF DESCRIPTION OF DRAWINGS

The present disclosure will be described hereafter with reference to the attached drawings which are given as non-limiting examples only, in which:

FIG. 6A through C are several views of an illustrative mold core;

FIG. 7A through C are several views of the illustrative housing of FIG. 5 with a bearing located therein;

FIG. 8A through C are several views of another illustrative embodiment of a housing;

FIG. 11 is an exploded view of the stopper assembly of FIGS. 9 and 10;

FIG. 19A through C are views of the crowder of FIG. 15 through 18, having various tooling attached thereto;

FIG. 20A through C are views of the crowder of FIG. 15 through 19 having illustrative sensor switches attached thereto;

Figure 1:
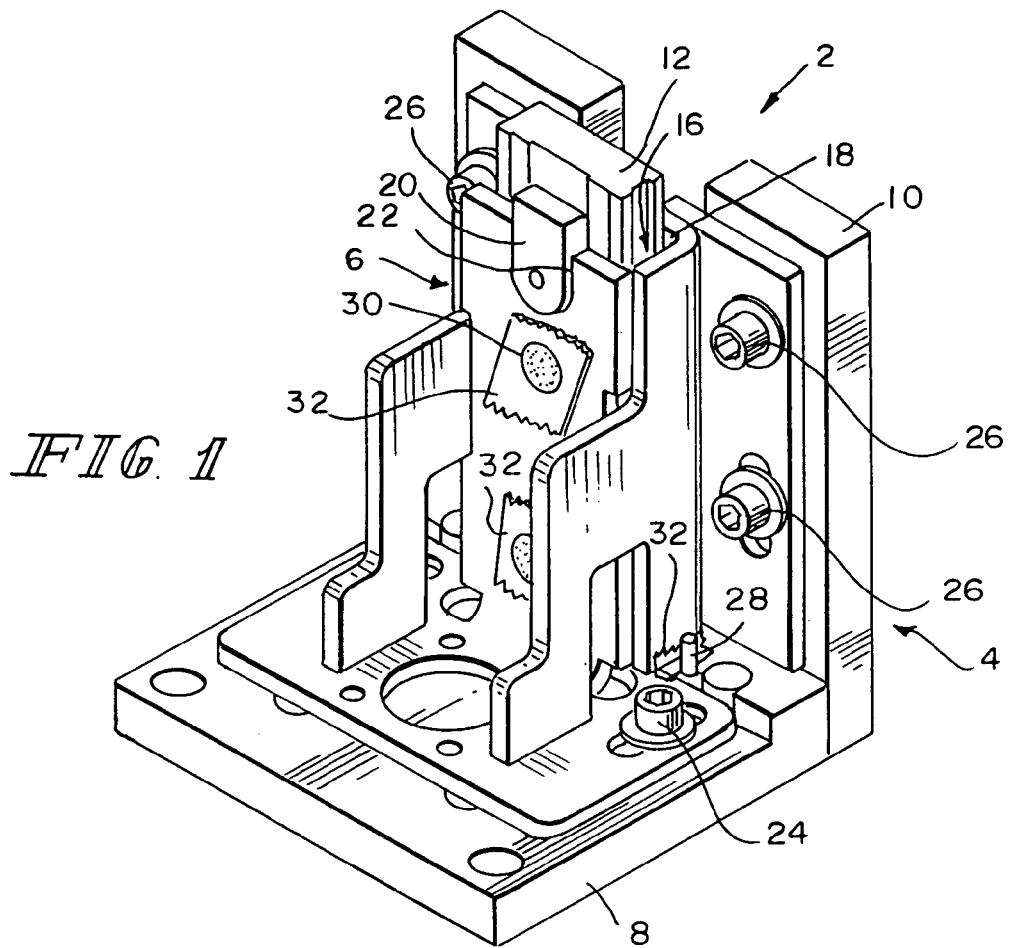
FIG. 1 is a perspective view of a mold assembly and housing.

Corresponding reference characters indicate corresponding parts throughout the several views. The exemplification set out herein illustrates embodiments of bearing devices and the method of making formable bearings, and such exemplification is not to be construed as limiting the scope of the devices or methods in any manner.

DETAILED DESCRIPTION OF THE DRAWINGS

A perspective view of a mold assembly 2 is shown in FIG. 1. This illustrative mold assembly 2 comprises a guide assembly 4 and a bearing part or housing 6. In this illustrative embodiment, guide assembly 4 comprises a base plate 8 and a back plate 10. Guide assembly 4 is configured to position housing 6 to receive a bearing. A mold core 12 is shown inserted within bearing space 14. (See, also, FIG. 2.) Illustratively, liquid bearing material 16 can be poured through bearing space opening 18 about the periphery of mold core 12 to fill bearing space 14. Once the bearing material 16 is solidified, a bearing is formed.

Openings 30, disposed in housing 6, illustratively serve to hold liquid bearing material within housing 6 during formation. This allows the bearing material, deposited into housing 6, to attach to the same without the use of adhesives, chemical bonding, or other means. Consequently, a high precision bearing surface is provided between moving parts at a reduced cost. In this illustrative embodiment, openings 30, located between bearing space 14 and the exterior of housing 6, are illustratively covered by a covering 32. (See, also, FIG. 2.) This prevents bearing material 16, which is poured into bearing space 14, from exiting housing 6. This covering can be temporary, since the liquid bearing material solidifies to produce the bearing surface. It is appreciated that this covering 32 can be any suitable barrier, including adhesive tape or silicone sealer, for example.

Mold core 12, in this illustrative embodiment, comprises a core guide 20 that is illustratively attached thereto and seated within a guide 22. This assists aligning mold core 12 in a desired location within bearing space 14 during deposit of bearing material 16. (See, also, FIG. 2.) As further shown in FIG. 1, housing 6 is illustratively located and/or secured into position by pins 28 and fasteners 24, 26, which seat housing 6 in the desired position to receive bearing material 16.

Figure 2:
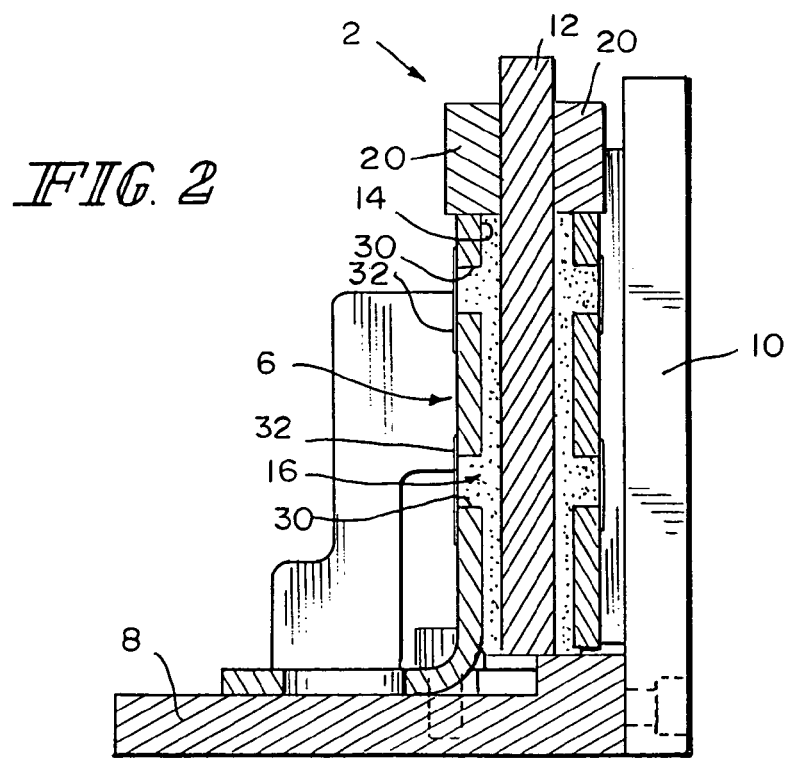
FIG. 2 is a side cross-sectional view of the mold assembly and housing of FIG. 1.

It is appreciated that the embodiment of housing 6 and assembly 4 shown in FIGS. 1 and 2 are for illustrative purposes. And though this embodiment shows a slide bearing, it is appreciated that other embodiments of the core may be of any size, shape, or cross-section, and can be for any type of moving part that requires contact with a bearing surface, be it round, spherical, square, cylindrical, etc. It is further appreciated that the bearing material used herein can be a urethane, as well as other bearing materials, such as nylon. The bearing material may also be any other like material known by those skilled in the art or to be developed in the future. In an alternative embodiment, such bearing material may also be a non-liquid material, such as a putty or other formable material, that can be deposited into a space and be formed into an effective bearing surface.

FIG. 2 is a side cross-sectional view of mold assembly 2. The cross-sectional portion of housing 6 shows bearing space 14 filled with bearing material 16 between the same and core 12. Also shown is bearing material 16 and openings 30, which provide the aforementioned attachment of bearing material 16 to housing 6. Also shown are core guides 20, each illustratively positioned on opposing sides of core 12 to assist in guiding or locating the same adjacent bearing space 14. When bearing material 16 is solidified, core 12 can be removed and a slide replaced therein. (See also FIGS. 9, 15, and 21.) It is appreciated, that in the illustrative embodiment, the bearing spaces and surfaces need not be precisely manufactured for the housing. Rather, a space is made and a core placed in a desired position. The bearing material will form around the core and fill the space, creating the desired alignment.

Figure 3:
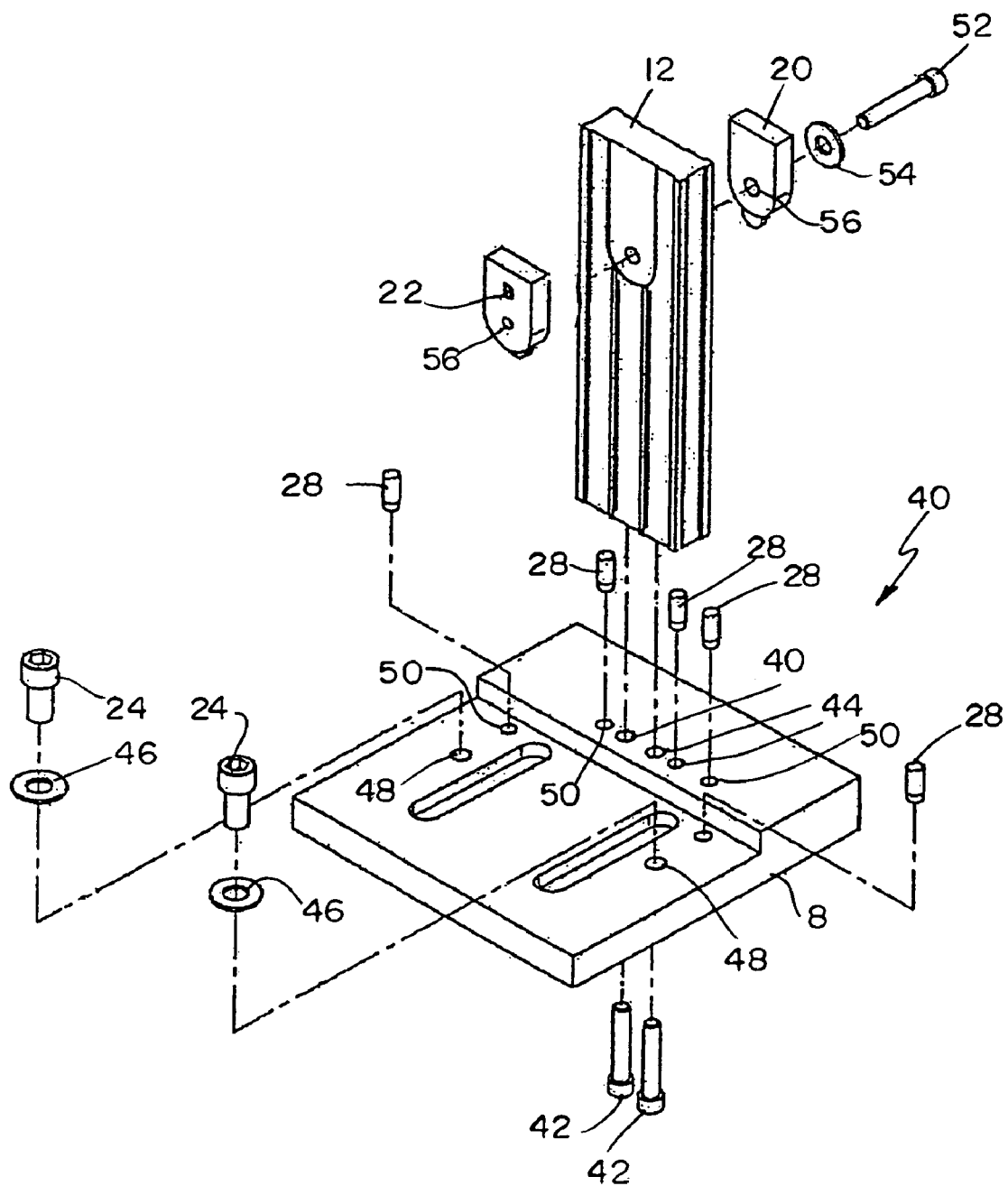
FIG. 3 is an exploded view of an illustrative mold assembly.

An exploded view of an illustrative mold assembly 40 is shown in FIG. 3. This illustrative embodiment comprises a base plate 8 and a core 12 attached thereto. Core 12 is attached to plate 8 via fasteners 42 that extend through bores 44 of plate 8 and into the bottom of core 12. Also shown are fasteners 24 which attach to or extend through washers 46 and into bores 48 to secure a housing thereto. Pins 28 are fitted in bores 50 to further assist in aligning housing 6 onto the mold assembly. Core guides 20 are shown illustratively attached to core 12 via fasteners 52 disposed through washer 54 and bores 56.

It is appreciated that the positioning of the components of mold assembly 40 shown herein can be of any size, shape, or character to accommodate any desired housing. It is further appreciated that shown herein is one illustrative example of how a housing can be secured to a mold assembly to produce a bearing under repeatable conditions. It is the positioning of the housing with respect to the core and the mold assembly that creates the precision in forming the bearing.

Figure 4:
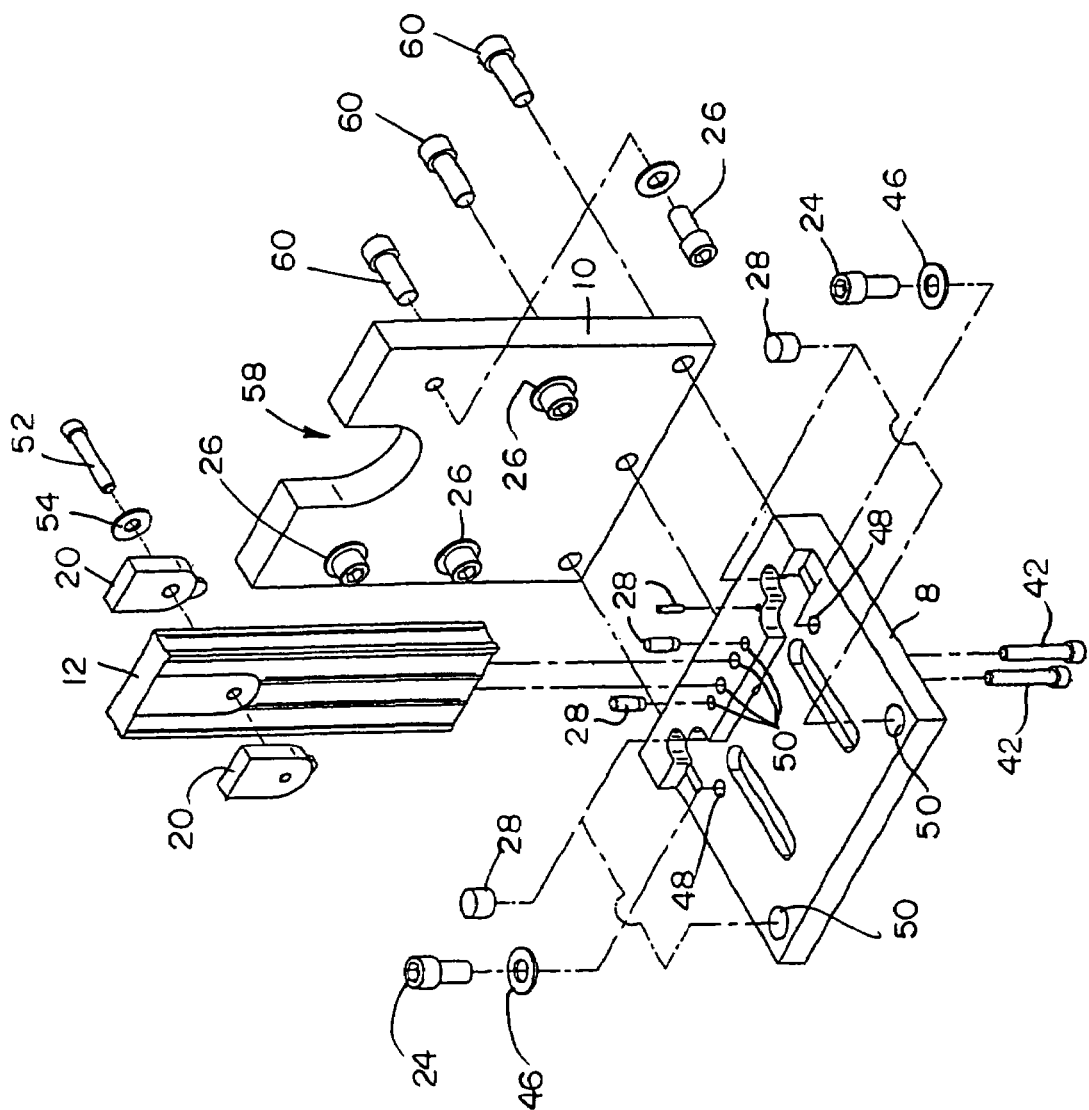
FIG. 4 is an exploded view of another illustrative embodiment of a mold assembly.

An exploded view of another illustrative mold assembly 58 is shown in FIG. 4. This embodiment, similar to the embodiment disclosed in FIG. 1, also comprises a back plate 10. It is appreciated that such an assembly can take on any variety of configurations and have guides, such as guide pins 28, and fasteners 24 and 26 to locate and secure the housing at any desired location to create the appropriate bearing surface. FIG. 4 also shows fasteners 60 that attach back plate 10 to base plate 8.

Figure 5A:
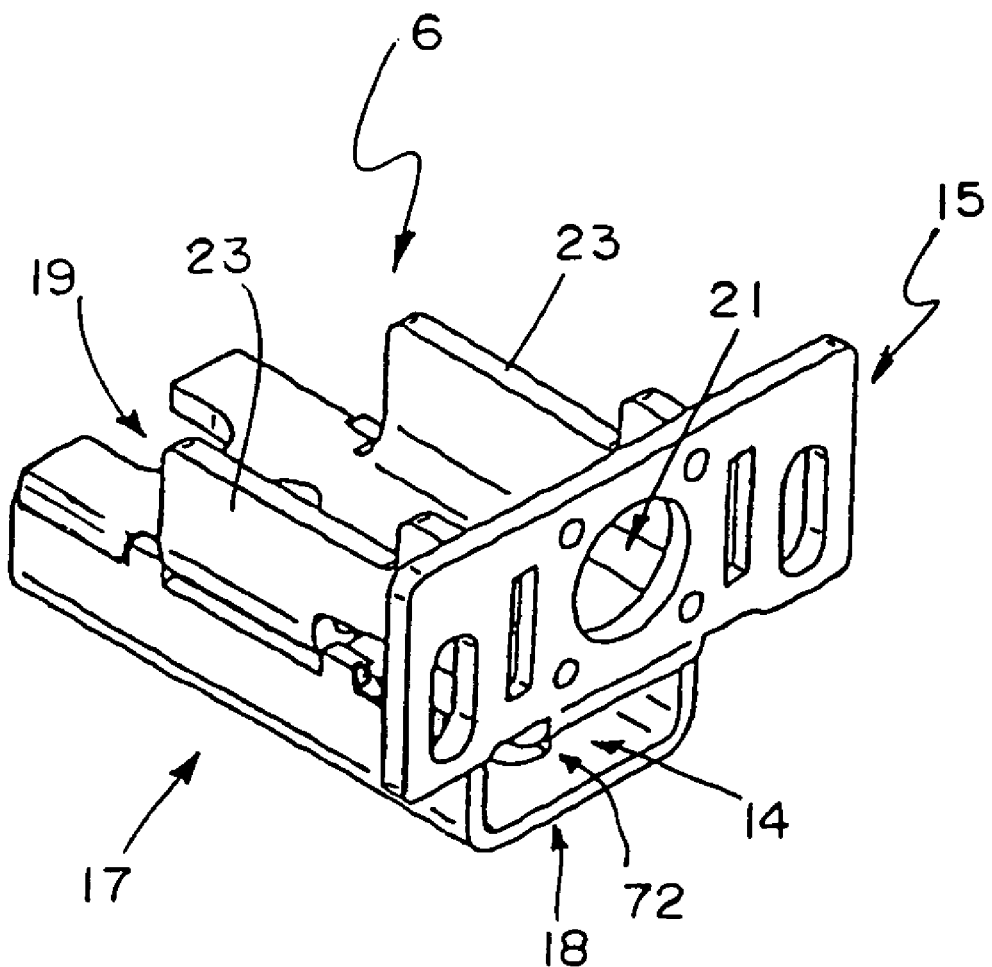
FIGS. 5A and B are several views of an illustrative housing.
Figure 5B:
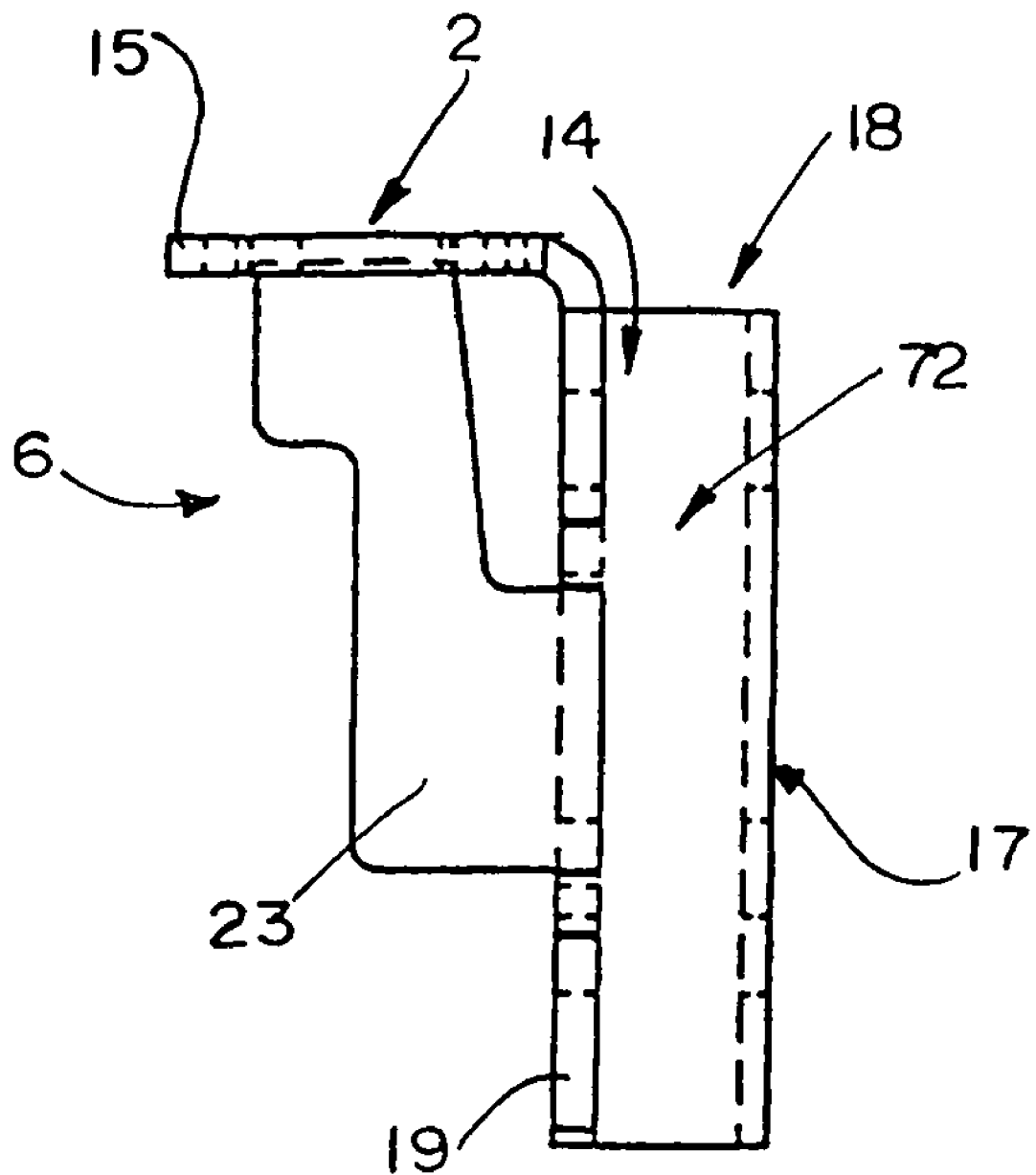

FIGS. 5A and B are several views of housing 6. As will be discussed further herein with regard to illustrative devices or assemblies that use formable bearings, housing 6 is an example of the types of housing used as a component of the slide assemblies, such as assemblies 104 and 204. (See FIGS. 9 and 15.) This illustrative embodiment comprises a face bracket 15 located adjacent opening 18. Face bracket 15 comprises a bore 21 configured to receive a piston rod from a cylinder, such as rod 110 shown in FIG. 11. Bracket 15 can also be used to secure housing 6 to one of the mold assemblies from FIG. 1 through 3, and/or attach to an assembly line as part of a slide assembly. The longitudinal extent 17 of housing 6 further defines bearing space 14. A recess 19 is shown for receiving a slide stop, such as stop 126. (See, for example, FIG. 11.) Brackets 23 extend from the longitudinal extent 17 of housing 6, illustratively for mounting purposes. FIG. 5B is a side view of housing 6 showing the illustrative profile of bracket 23 and the edge of face bracket 15. Also shown is bearing space 14 of longitudinal extent 17.

FIG. 6A through C are several views of an illustrative mold core 12. Illustratively, ridges 68 are located on the periphery surface of core 12. These ridges 68 form corresponding channels within the bearing surface to allow lubricant and/or dirt and debris to pass therethrough. Thus, the shape and contour of the bearing can be defined by simply making a corresponding core. Also shown is a bore 27 configured to receive a fastener that attaches core guide 20 to core 12. (See, also, FIGS. 1 and 2.)

FIG. 7A through C are several views of housing 6 with bearing 70 formed and solidified therein. As shown in FIG. 7A, bearing 70 forms cavity 72 along the longitudinal extent 17. Also shown in this cross-sectional view is the manner in which bearing 70 attaches itself to housing 6. The openings 30 that are disposed through housing 6 are shown filled with the bearing material 70. Filling these openings 30 secures bearing 70 to housing 6. This, again, allows the bearing to be secured without requiring a physical or chemical bond between housing 6 and bearing 70. Recess 19, shown in FIG. 7B, is not filled with bearing material 70. This allows recess 19 to receive the slide stop. The front view of housing 6 shown in FIG. 7C depicts the cross-section of bearing surfaces 74. A slide can be inserted into cavity 72 and ride along surfaces 74.

FIG. 8A through C show another illustrative housing 6, also with bearing 70, cavity 72, and bearing surface 74. It is noted that housing 6 from FIG. 8 differs from that shown in FIG. 7 by virtue of bracket 76 that is attached to longitudinal extent 17. Bracket 76 can be used to secure to one of the mold assemblies, as shown in FIG. 1, and/or to mount to an assembly line.

Figure 9A:
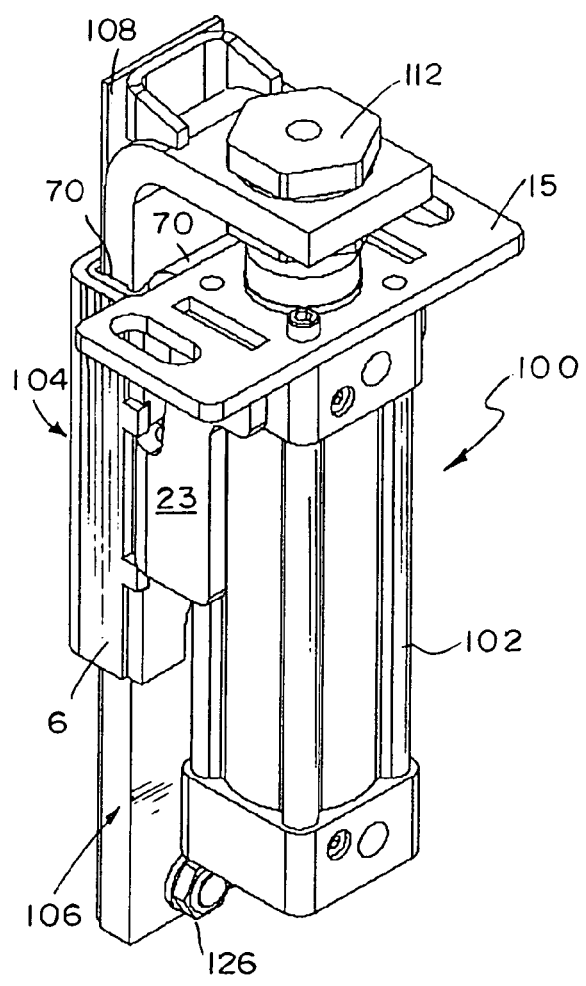
FIGS. 9A and B are perspective views of an illustrative embodiment of a stopper assembly.
Figure 9B:
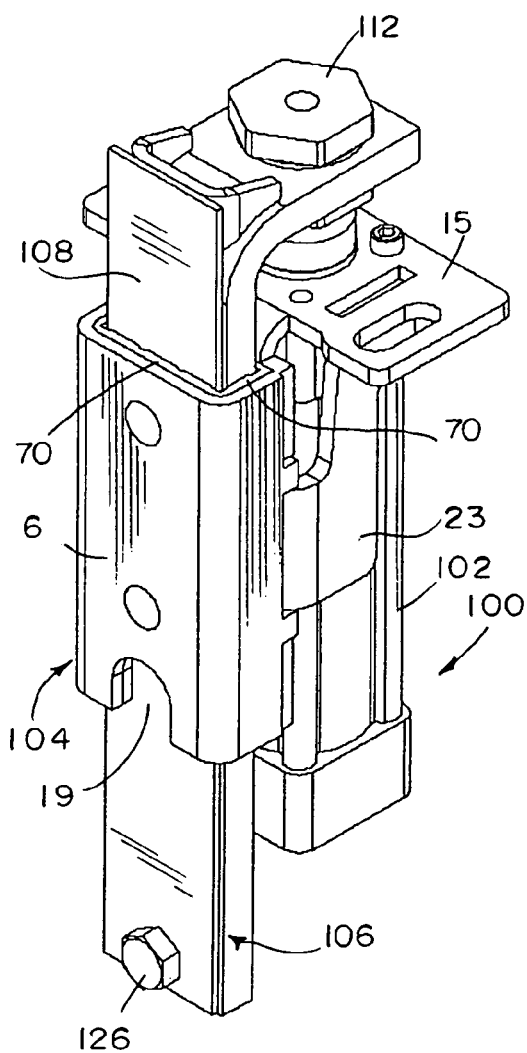

FIGS. 9A and B are perspective views of an illustrative embodiment of a stopper 100. Stopper 100 illustratively comprises a cylinder 102 which can be a pneumatic, hydraulic, or an electrical cylinder. Stopper 100 also comprises a bearing assembly 104 having a slide 106, an impact plate 108 attached thereto, a piston rod 110 extending from cylinder 102, and a thrust washer 112 that attaches slide 106 to rod 110. (See also FIGS. 10A and B.) It is contemplated that stopper 100 is configured to receive an impact force on impact plate 108, and that force is absorbed by the bearing within assembly 104. The bearing 70 is made from a resilient or like material that will be able to absorb at least a potion of the impact force. Accordingly, slides may be configured so that the formable bearing can receive an impact force, rather than avoid the impact force. Stopper 126, located on slide 106 and its corresponding recess 19, is shown FIG. 9B.

Figures 10A, 10B:
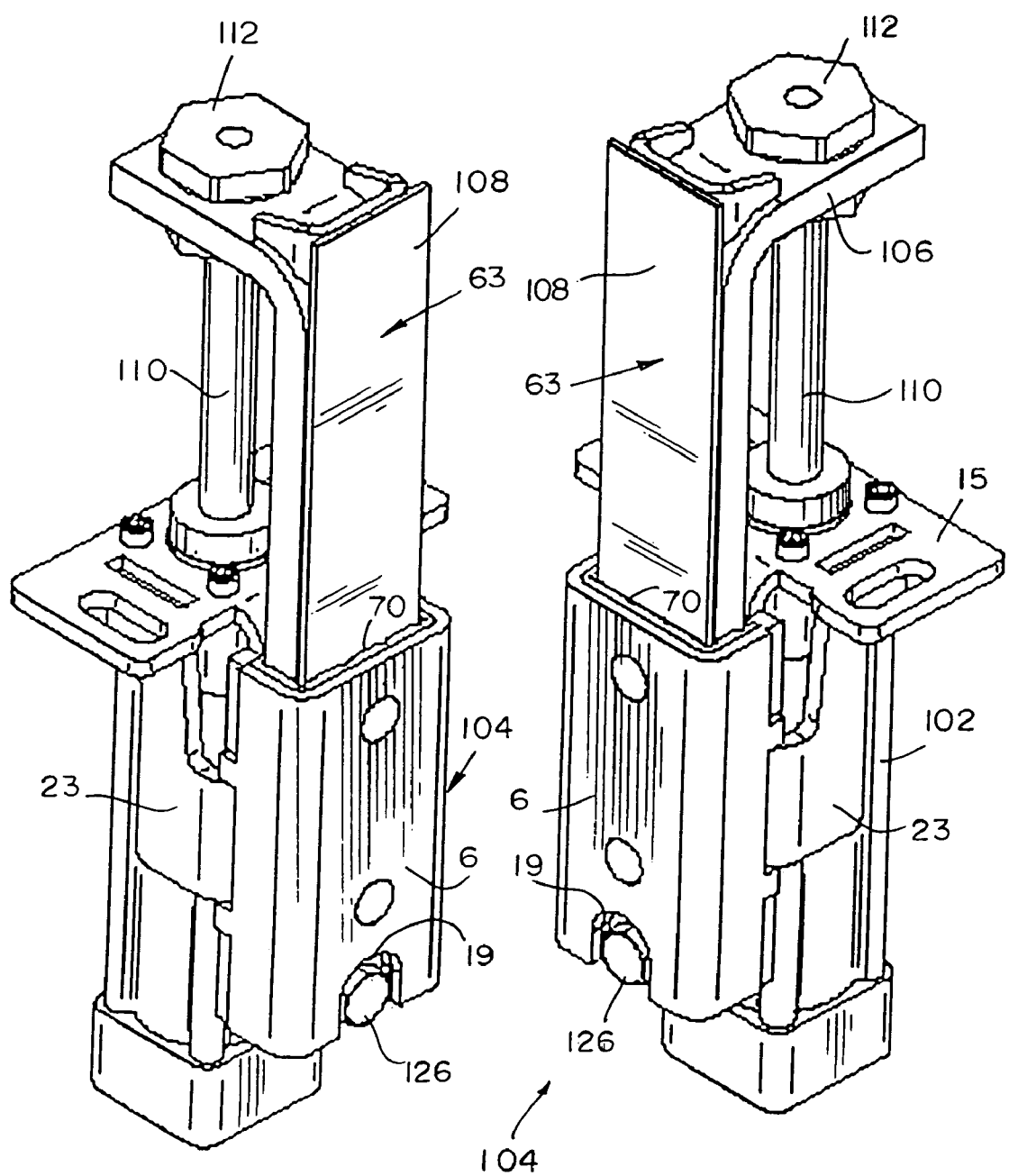
FIGS. 10A and B are perspective views of the stopper assemblies of FIGS. 9A and B, respectively, with the slide located in the extended position

FIGS. 10A and B are perspective views of stopper 100 with piston rod 110 located in the extended position. By extending rod 110, impact plate 108 is exposed from assembly 104. Plate 108 is, thus, available to receive an impact force 63. Also shown is the engagement between recess 19 and stop 126. This engagement limits the length of travel of slide 106 and plate 108.

An exploded view of stopper 100 is shown in FIG. 11. The exploded view shows extension and retraction air ports 114 and 116, respectively, coupled to cylinder 102. It is contemplated, however, that cylinder 102 may be of any variety of actuator, recognized by those skilled in the art, including electrical or hydraulic. Rod 110 extends from cylinder 102, and is caused to selectively extend and retract relative to cylinder 102 when power is delivered through ports 114 and 116. Rod 110 also extends through a bore 21 disposed through bracket 15 on bearing assembly 104. Bearing assembly 104 comprises housing 6 shown in FIG. 1. It is contemplated, however, that such a bearing assembly 104, like housing 6, is of illustrative configuration. It is further contemplated that other such bearing assemblies could be used so long as the bearing, illustratively like the bearing 70 of assembly 104, is resilient and/or shock absorbing. Fasteners 122 are illustratively disposed through bracket 15 of housing 6, and attach to cylinder 102 thereto. Slide 106 is disposed into cavity 72, which is lined by bearing 70, thus, allowing slide 106 to move therein. Illustratively, stop 126 is attached to slide 106 to limit movement of the same, preventing it from being completely removed from housing 6, unless stop 126 is removed or otherwise adjusted. In addition, rod 110 extends through bore 128, disposed through slide 106. In this illustrative embodiment, the contemplated impact point on the slide 106 is located on impact plate 108. This causes slide 106 to either bend or move and cause a portion of bearing 70 to compress or otherwise deform. Rod 110 attaches to slide 106 by being disposed through oval bore 128, and couple to thrust washers 130. This prevents rod 110 from bending as either slide 106 bends, or bearing 70 compresses or deforms.

Figure 12:
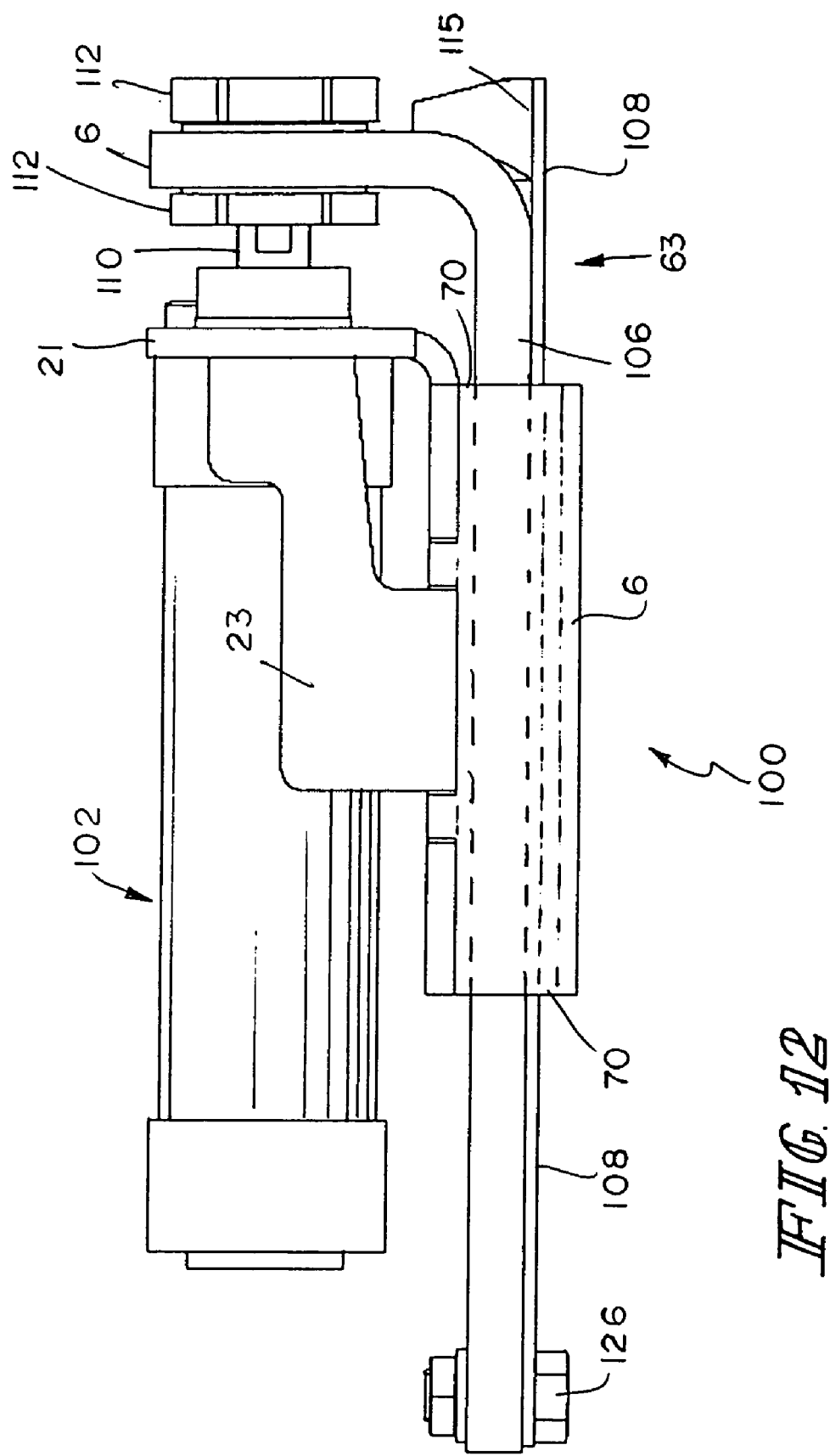
FIG. 12 is a side view of the stopper assembly of FIG. 9 through 11.

The side view of stopper 100 is shown in FIG. 12. In this illustrative embodiment, it is contemplated that a force 63 will impact plate 108 on slide 106. This force 63, depending on its size, may cause a portion of bearing 70, particularly the portion located opposite the direction of force 63, to compress. In the illustrative embodiment, urethane can be used for the bearing material. Because such is known for its absorbing properties, as well as its resiliency, after the impact of force 63 causes slide 106 to compress bearing 70, the resiliency of bearing 70 will cause slide 106 to return to its original position. This is done without causing damage to rod 110 and cylinder 102, because the oval bore 128 in slide 106 moves in direction 134 independently of piston rod 110. (See, also, FIG. 11.)

Figure 13:
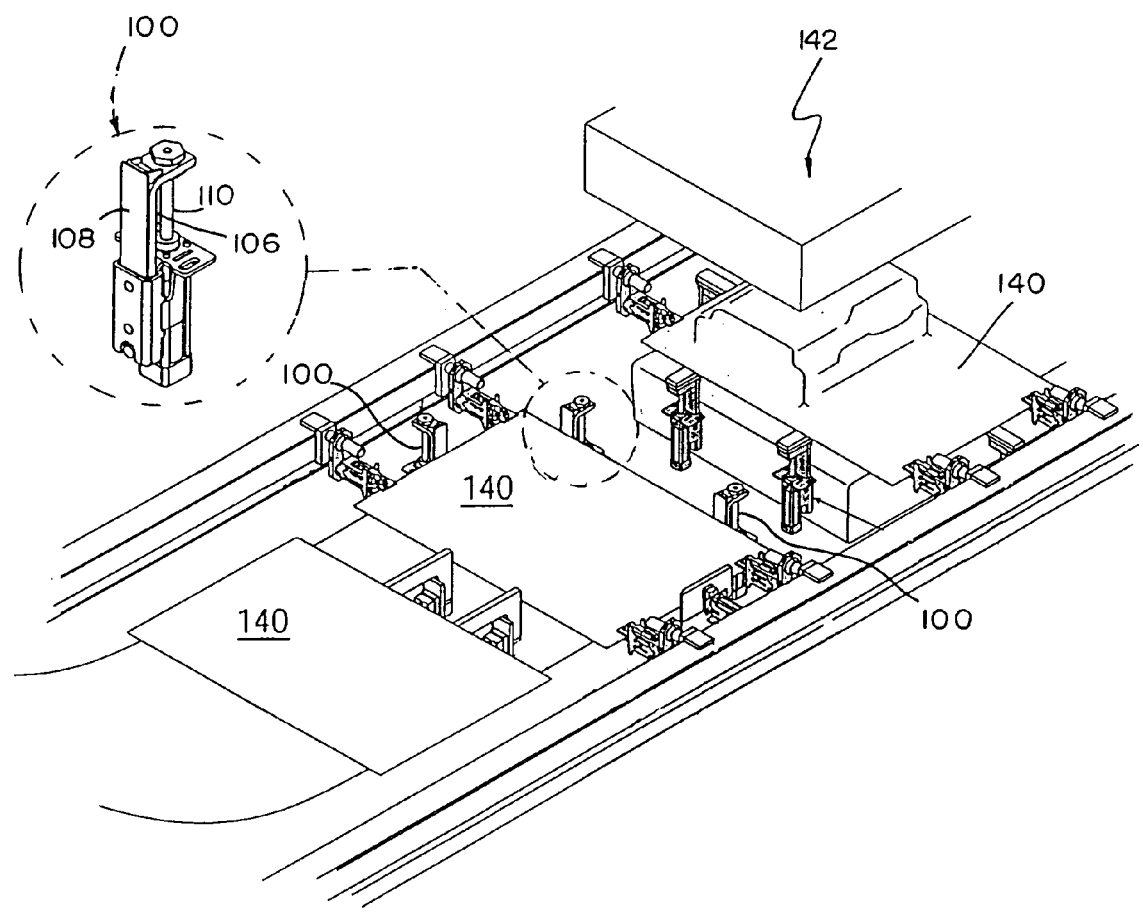
FIG. 13 is a perspective view of an illustrative assembly line employing stopper assemblies of the type shown in FIG. 9 through 12.

FIG. 13 is a perspective view of an illustrative assembly line employing stopper 100. In this example, a sheet metal panel 140 is stopped in position prior to stamping. Slide 106 of stopper 100 is extended to receive the impact of the sheet metal panel 140 at a specific point along the assembly line. Once panel 140 has engaged stopper 100 at impact plate 108, it is or can be properly positioned. Piston rod 110 and, consequently, slide 106 can then be retracted so panel 140 may slide there over and move into position on press 142.

Figure 14:
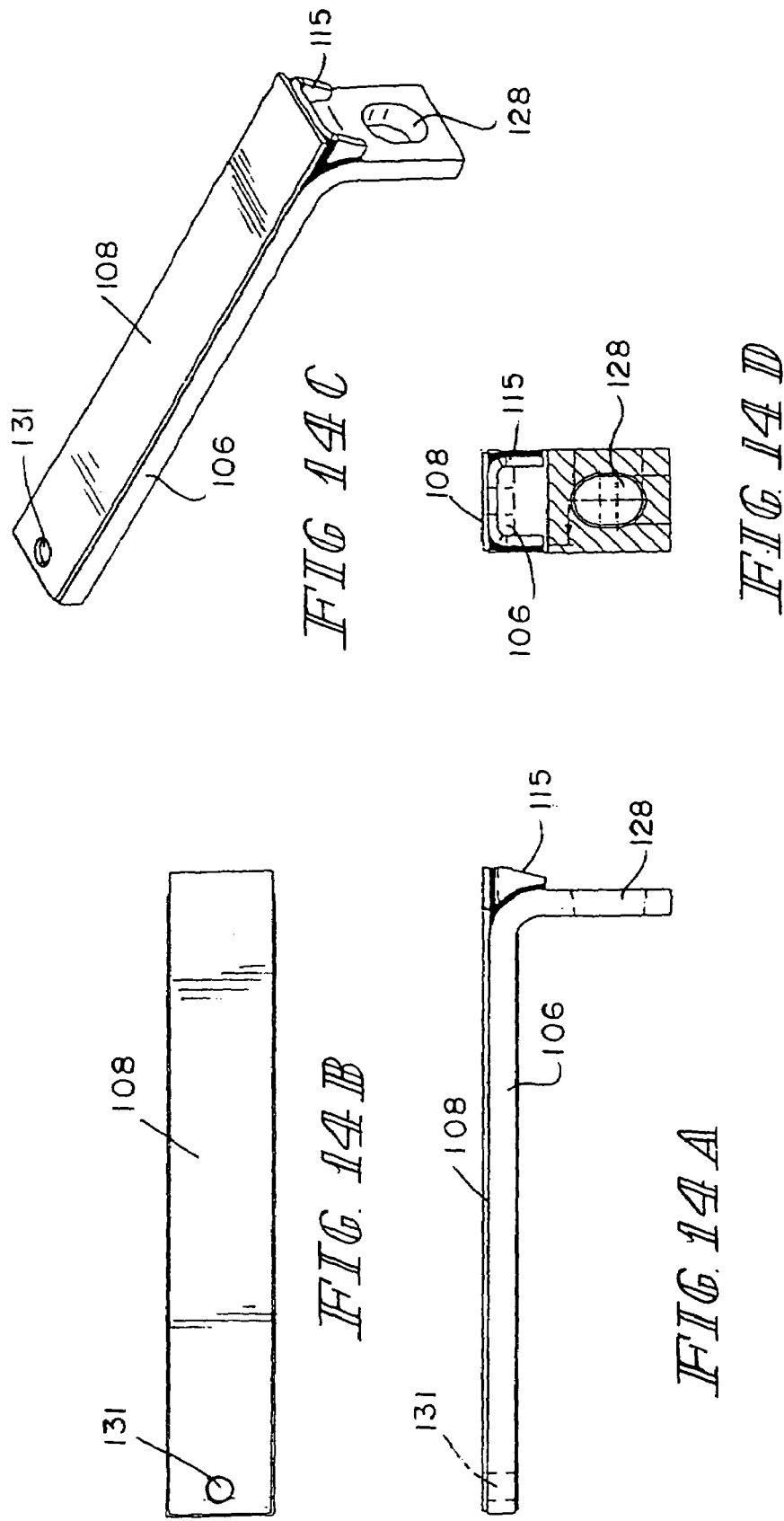
FIG. 14A through D show several views of the illustrative slide and impact plate of the stopper assemblies of FIG. 9 through 13.

FIG. 14A through D are several views of slide 106 with impact plate 108 attached thereto. FIGS. 14A, C, and D, show an extension 115 that allows impact plate 108 to extend beyond slide 106. Shown in FIGS. 14A, C, and D is illustrative oval bore 128. This allows slide 106 to move relative to piston rod 110 without damaging the same. (See, also, FIG. 11.) A stop bore 131 is disposed illustratively through slide 106 and impact plate 128. Bore 131 is configured to accommodate a slide stop, such as stop 126. (See FIG. 12.) It is appreciated that the configuration of impact plate 108 is of illustrative nature and can be modified to suit any particular stopping need.

Figure 15:
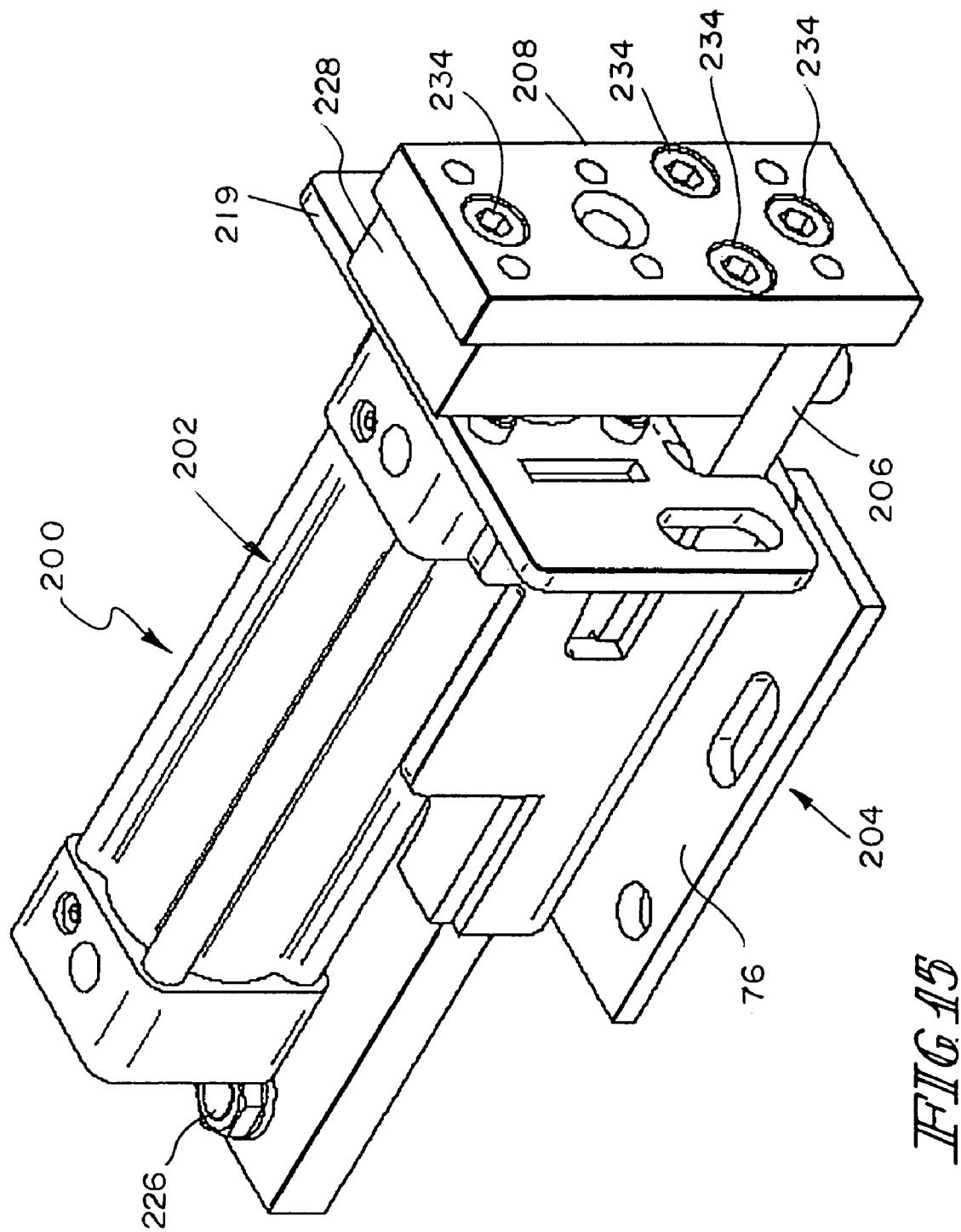
FIG. 15 is a perspective view of an illustrative embodiment of a crowder assembly.

FIG. 15 is a perspective view of an illustrative embodiment of a crowder device 200. Crowder 200 is illustratively used to push parts into particular locations by extending and/or retracting its slide 206. Crowder 200 is shown in the retracted position and comprises a formable bearing assembly 204, similar to assembly 104 of stopper 100. Crowder 200 further comprises a cylinder 202, a slide 206, and a bearing assembly 204. Slide 206 is disposed through assembly 204. Plate 208 is attached to slide 206 and rod 210. (See, also, FIG. 16.) Any variety of accessories or toolings can be fitted onto plate 208 for any variety of moving tasks. (See, also, FIG. 19A through C.) It is appreciated that crowder 200 can operate by extending slide 206 in either the horizontal or vertical orientations.

Figure 16:
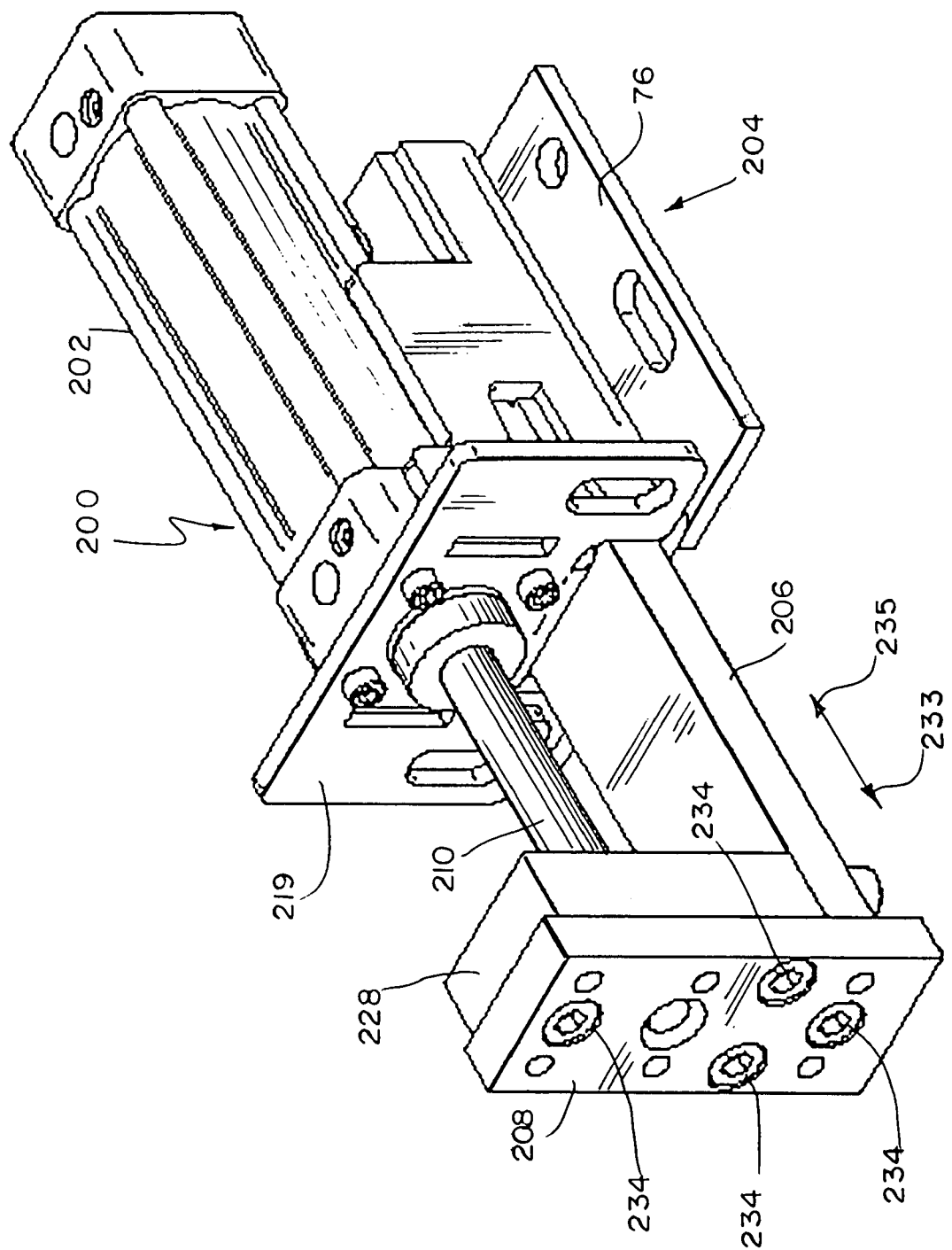
FIG. 16 is another perspective view of the crowder assembly of FIG. 15, with the slide located in the extended position.

A perspective view of crowder 200 is shown in FIG. 16, with slide 206 located in the extended position. It is appreciated from this view and, as contrasted from FIG. 15, that plate 208 can push an object outward in direction 233, or pull an object inward in direction 235.

Figure 17:
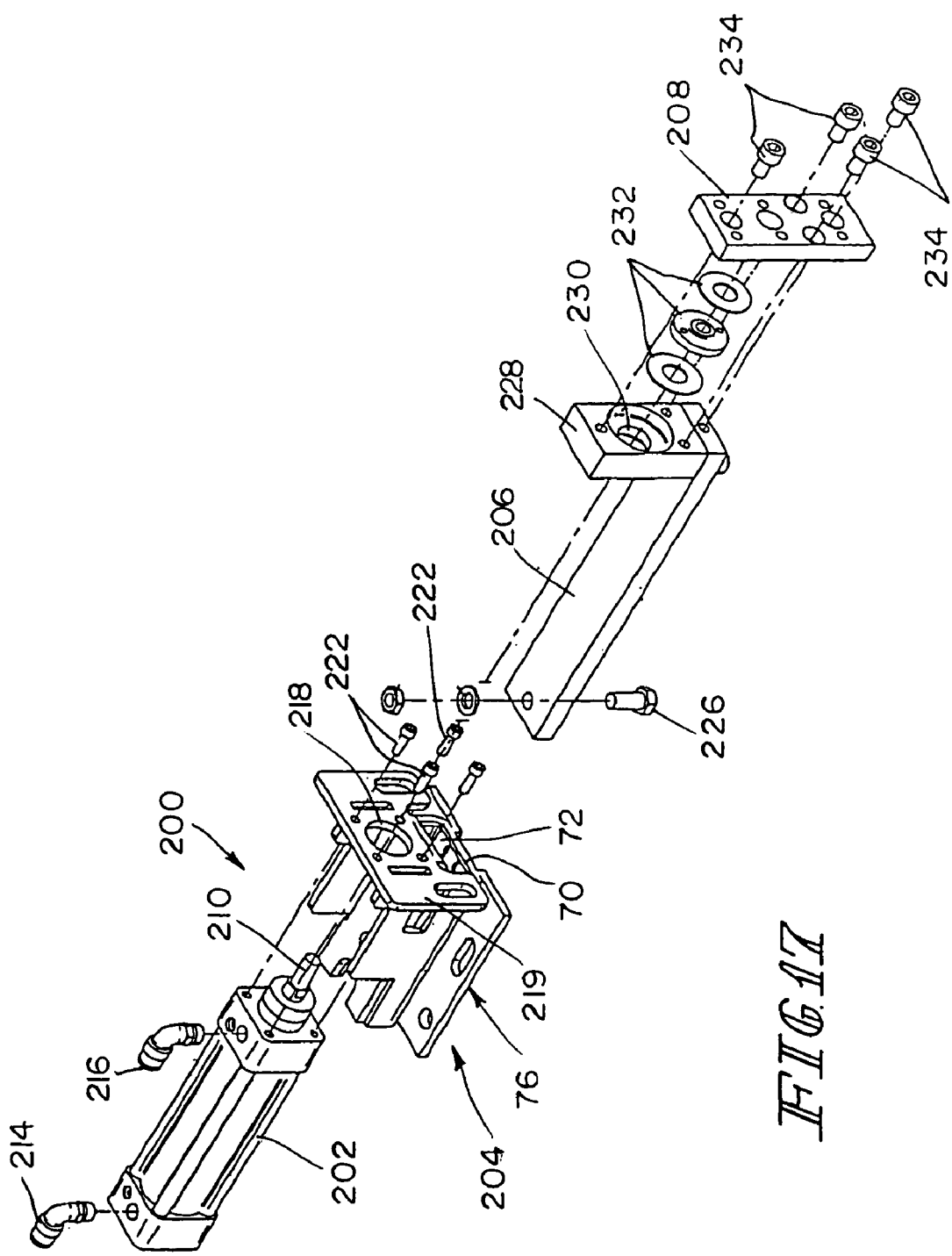
FIG. 17 is an exploded view of the crowder assembly of FIGS. 15 and 16.

A perspective exploded view of crowder 200 is shown in FIG. 17. In this illustrative embodiment, similar to the stopper 100, crowder 200 comprises a cylinder 202 that is a pneumatic cylinder having extension and retraction ports 214, 216. It is contemplated that the cylinder may also be either hydraulic or electrical. Rod 210 is extendable and retractable from cylinder 202, and is disposed through bore 218 of bearing assembly 204. Bearing 70 lines cavity 72 in assembly 204. Note that bearing assembly 204 herein is distinguishable from assembly 104 by virtue of bracket 76 that allows the bearing assembly 204 to attach to a surface. (See, also, FIG. 7.) Fasteners 222 attach bearing assembly 204 to cylinder 202 via plate 219. Slide 206 is disposed through cavity 72, and is moveable along bearing 70. A stop 226, similar to stop 126 of stopper 100, is attached to slide 206 to limit movement thereof.

Extending from slide 206 is a base 228 that receives the plate 208. Plate 208 is configured to contact an article, or attach to a tooling that contacts an article, to move the same pursuant extension and retraction of rod 210. In this illustrative embodiment, a bore 230 is disposed through base 228. Illustratively, using washers 232 and fasteners 234, plate 208 is attached to base 228, and rod 210 is attached to base 228, as well as extending and retracting slide 206.

Figure 18:
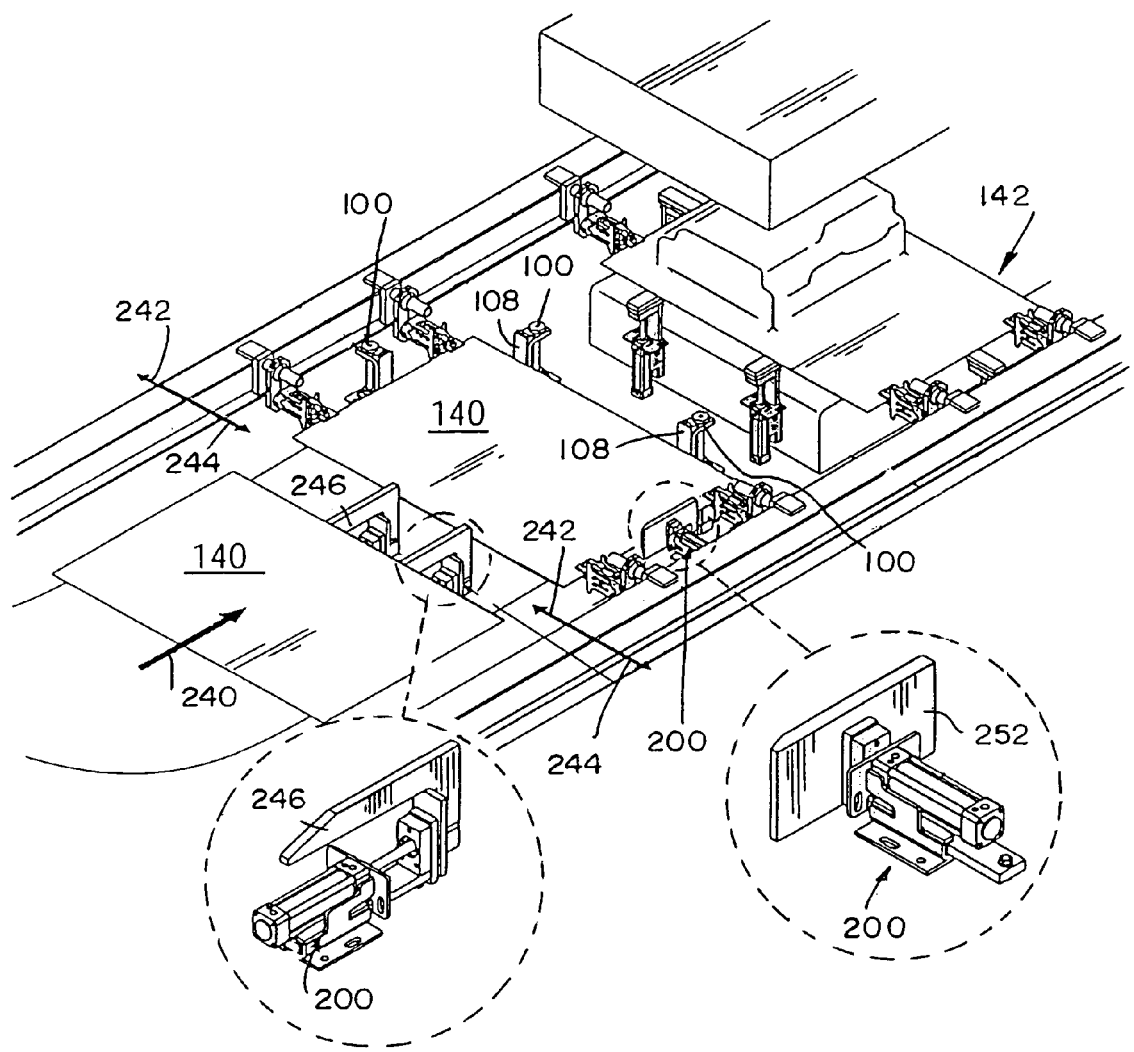
FIG. 18 is a perspective view of an illustrative assembly line employing crowder assemblies of the type shown in FIG. 15 through 17.

A perspective view of an illustrative assembly line employing crowder assemblies 200 is shown in FIG. 18. In this example, crowder 200 can be used in conjunction with stopper 100. Placement of sheet metal panel 140 in the desired location on the line can be assisted by crowder 200 in conjunction with tooling 246. The sheet metal panel 140 can be placed on tooling 246 and transferred along the assembly line. Illustratively, sheet metal panel 140 can then engage impact plate 108 of stopper 100, limiting its movement in ensuring desired placement in direction 240. Sheet metal panel 140 can also be moved in directions 242 and 244 by use of tooling 252 on crowder 200, which moves sheet metal panel 140 in either direction 240 or 242 to create desired alignment of sheet metal 140 within press 142.

FIG. 19A through C show several views of crowder 200. The formable bearing 220 in crowder 200 allows the same to absorb vertical shock from articles that drop onto it. For example, as shown in FIG. 19A, if a force 245 is exerted on, in this embodiment, tooling 246, that force causes movement of plate 208 and, consequently, slide 206 in direction 247. This may occur when the crowder is used to support the sheet metal panel or workpiece, or portion of the sheet metal is dropped onto the crowder. The resiliency of the formable bearing allows movement of slide 106 a distance (identified by arrows 248), limited by surface 250 to which crowder 200 is illustratively attached. Plate 208 may impact surface 250, but the resiliency in the bearing will absorb the force, thereby preventing damage to crowder 200 itself. FIGS. 16B and C show alternate embodiments of crowder 200. Illustratively, the tooling attached to plate 208 include tooling 252, 254.

FIGS. 20A and B are perspective views of crowder 200 showing illustrative switches 256, 258 that can be attached thereto to serve functions known by those skilled in the art. For example, switches 256 and 258 can be used to limit the length crowder 200 extends or retracts, or activates another device. Switches 256, 258 may also sense the relative positioning of slide 206 or piston rod 210, or detect a workpiece. FIG. 20C shows various views of an illustrative embodiment of switch 258, which includes a mounting portion 261. The switch or sensor portion 263 can be located at any desired location on mounting portion 261. In addition, mounting portion 261 can be configured to attach to a mounting bar 259, as shown in FIGS. 20A and B. It is appreciated, however, that the configurations shown are illustrative. Switches 256, 258 can be of any other configuration suitable for any desired purpose on crowder 200. It is further appreciated that such switches can be used on stopper 100 and lifter 300.

Figure 21:
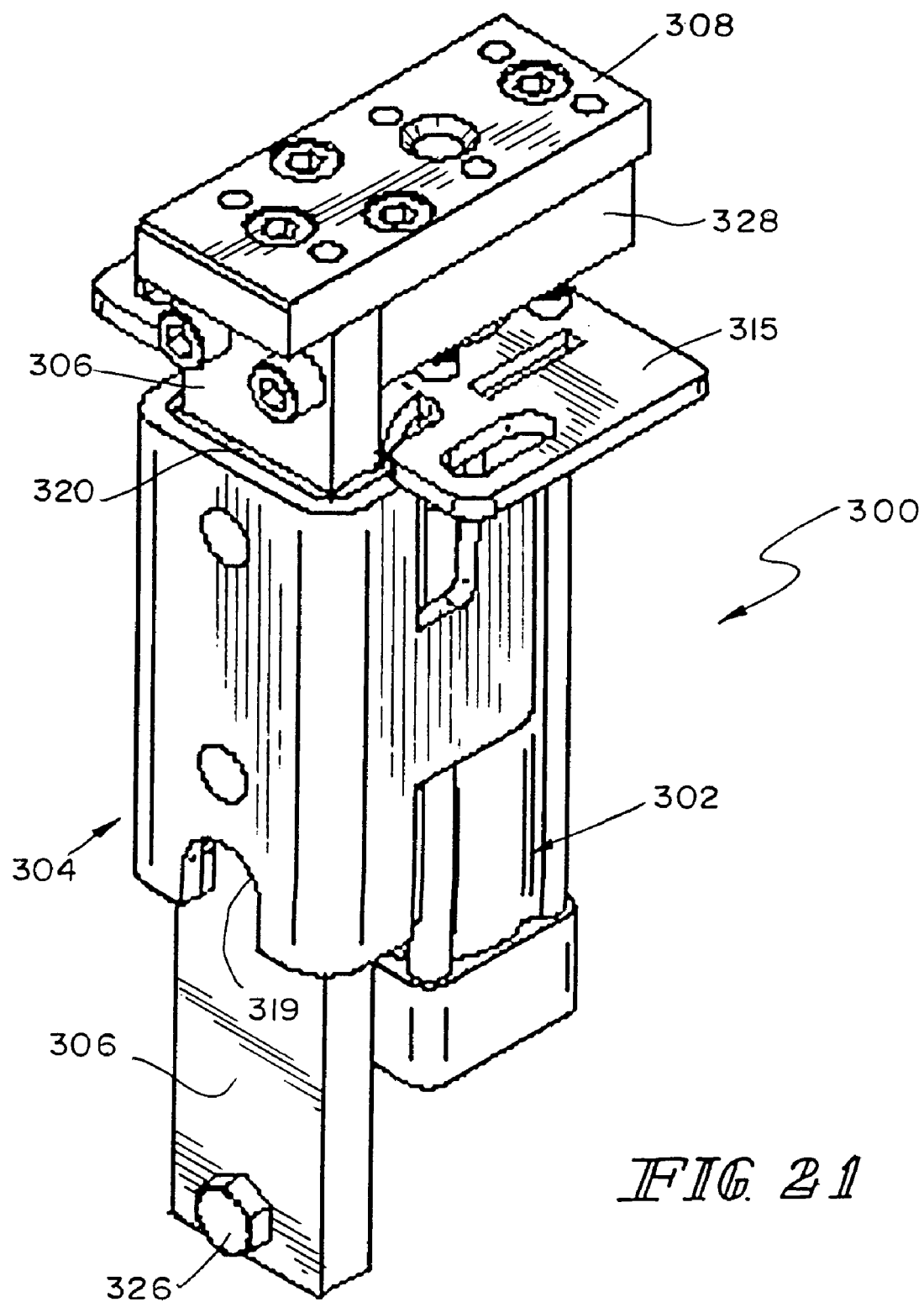
FIG. 21 is a perspective view an illustrative embodiment of a lifter assembly.
Figure 22:
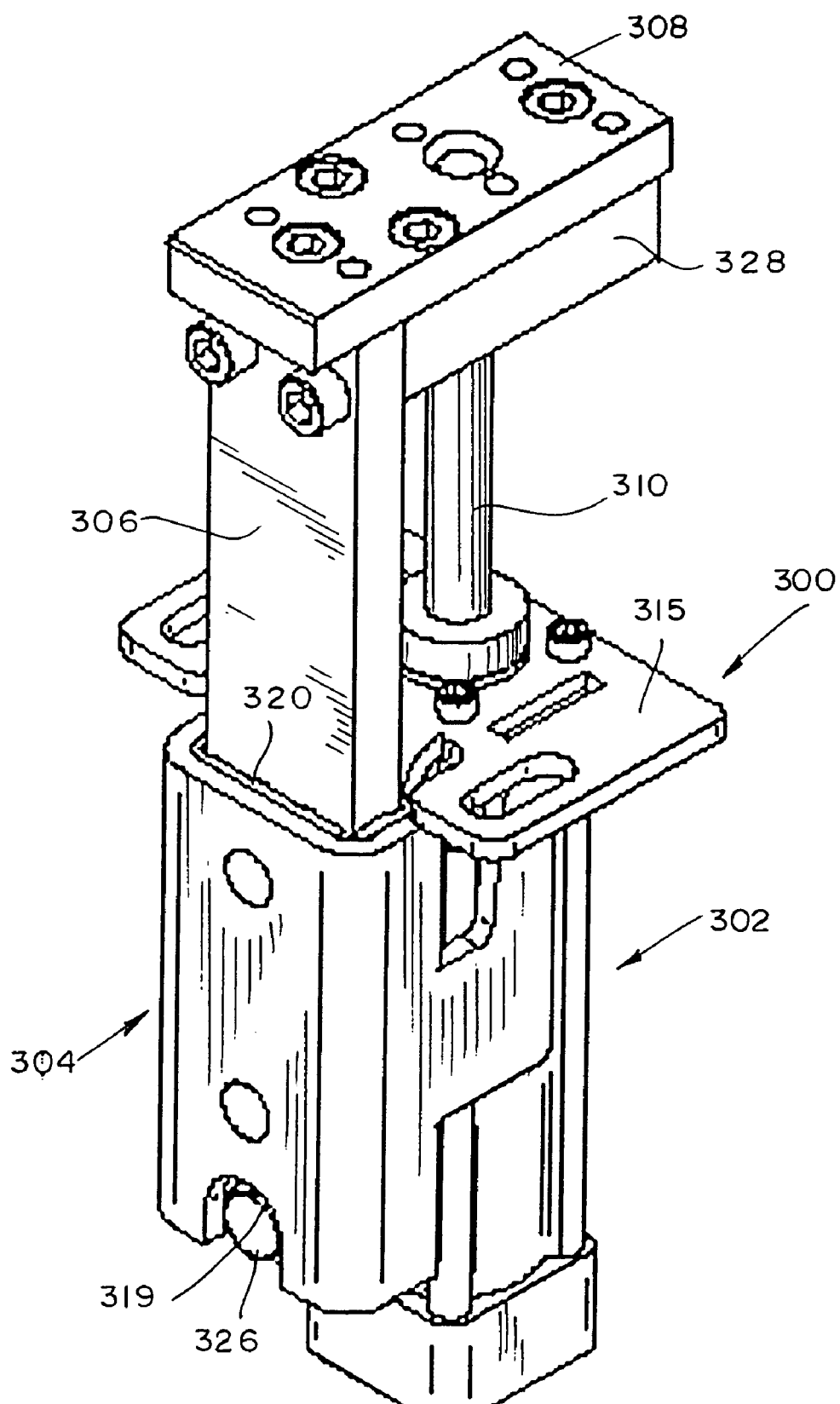
FIG. 22 is a perspective view the lifter assembly of FIG. 21 with having a slide located in the extended position.

FIG. 21 is a perspective view of a lifter 300. Similar to crowder 200, illustrative lifter 300 comprises a cylinder 302, bearing assembly 304, slide 306, and plate 308. An extended version of lifter 300 is shown in FIG. 22. Piston rod 310 extends from cylinder 302 to move plate 308. The length of the extension stroke is determined by stop 326 (located on slide 306) engaging recess 319 (located on housing 6 of assembly 304). In contrast to crowder device 200, however, lifter 300 is configured to lift or support work pieces or panels on plate 308, or a tooling attached to the same.

Figure 23:
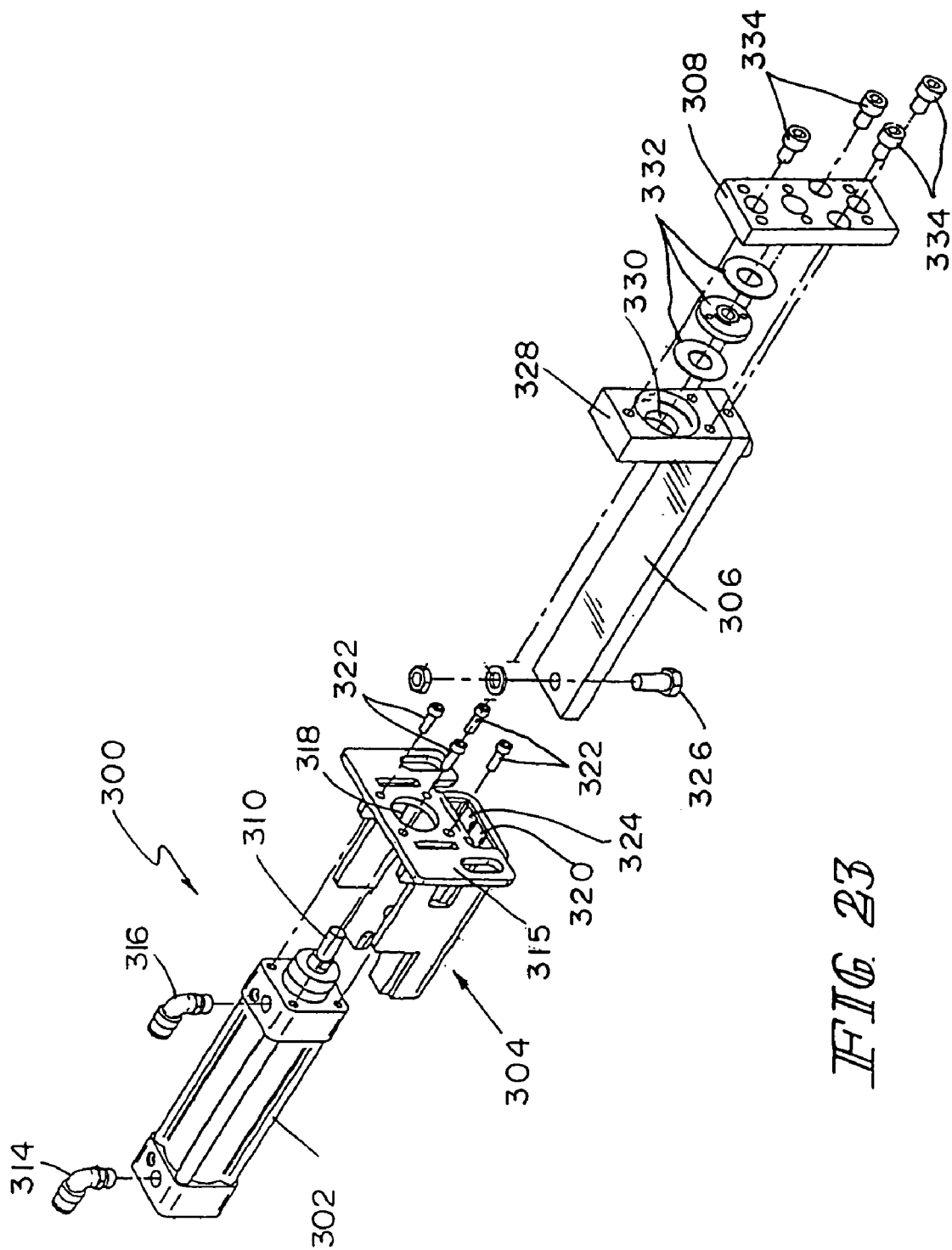
FIG. 23 is an exploded view of the lifter assembly of FIGS. 21 and 22.

FIG. 23 is an exploded perspective view of lifter 300. In this illustrative embodiment, and similar to crowder 200, lifter 300 comprises a cylinder 302 that is a pneumatic cylinder having extension and retraction ports 314, 316. It is, again, contemplated that cylinder 302 could alternatively be a hydraulic or electric actuator. Rod 310 is extendable and retractable from cylinder 302, and is disposed through bore 318 of bearing assembly 304. Bearing 320 lines opening 324, of assembly 304 and extends at least a portion of its length. Fasteners 322 attach bearing assembly 304 to cylinder 302 via plate 315. Slide 306 is disposed through opening 324 and is moveable along bearing 320. A stop 326, similar to stop 126 of stopper 100 is attached to slide 306 to limit movement thereof. Extending from slide 306 is base 328 that receives plate 308. Plate 308 is configured to engage an article, or attach to a tooling that engages an article, to move the same pursuant the extension and retraction of rod 310. In this illustrative embodiment, a bore 330 is disposed through base 328. Illustratively, washers 332 and fasteners 334 are used to attach plate 308 and rod 310 to base 328, similar to previous embodiments.

Figure 24:
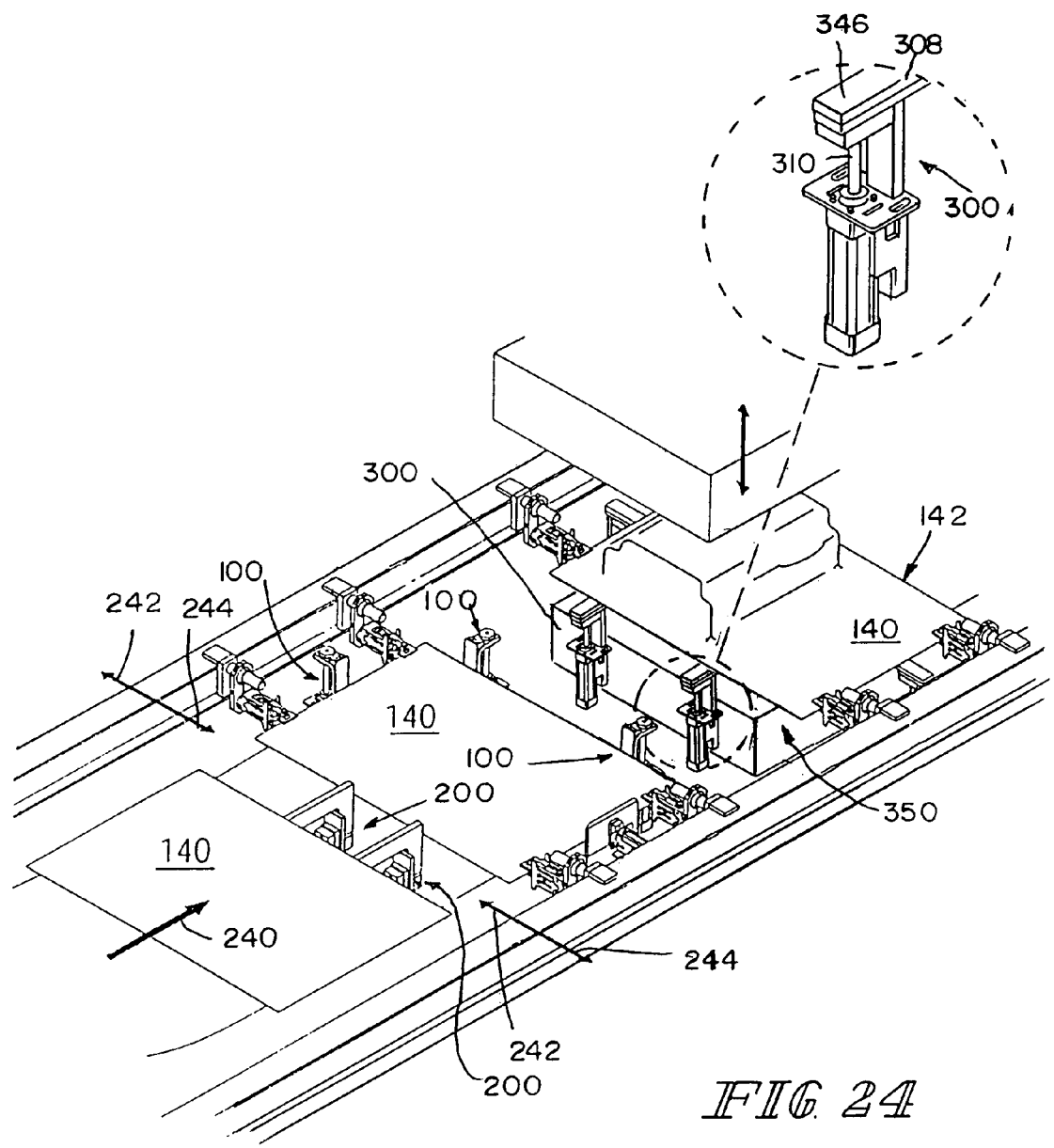
FIG. 24 is a perspective view of an illustrative assembly line employing lifter assemblies of the type shown in FIG. 21 through 23.

FIG. 24 is a perspective view of an illustrative assembly line, similar to the lines shown in FIGS. 13 and 18. In this example, lifters 300 are shown lifting a molded sheet metal panel 140 from press 142. In this illustrative embodiment, tooling 346 is attached to plate 308. Illustratively, lifters 300 are located on lower die 350, and the sheet metal panel 140 rests on top of tooling 346 during insertion and removal of the panel 140. After sheet metal 140 has been stamped, rod 310 is extended, thereby lifting sheet metal 140 up from lower die 350 to be removed and lead to the next process.

Figure 25:
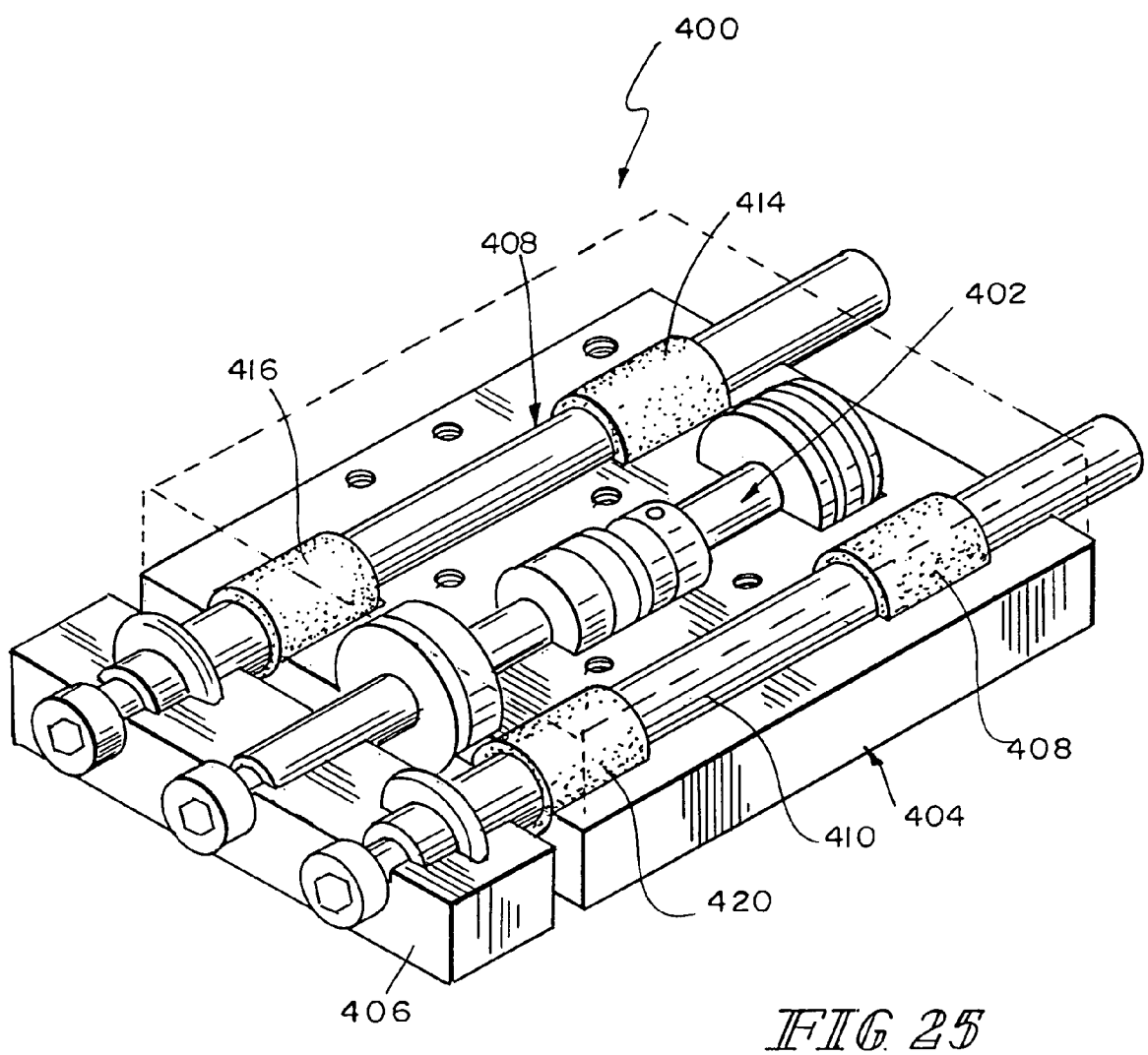
FIG. 25 is a perspective view of device that employs formable bearings.

FIG. 25 is another illustrative embodiment of a formable bearing slide apparatus 400. This embodiment comprises a piston assembly 402, located in housing 404. Block 406 is movable reciprocally with piston assembly 402. Guide rods 408, 410 are illustratively located on opposite sides of piston assembly 402 to provide balanced movement of block 406. On each rod 408, 410 is formable bearings 414, 416, and 418, 420, respectively. These bearings can be formed in a manner similar to that previously described with respect to FIGS. 1 and 2.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present disclosure as set forth in the following claims.

What is claimed is:

1. A formed slide bearing assembly comprising:
   a housing having a longitudinal extent and having a bearing space formed along the longitudinal extent;
   a slide disposed within the bearing space of the housing and movable along its longitudinal extent; and
   a bearing formed in the bearing space between the housing and the slide;
   wherein at least a portion of the bearing forms the contour of at least a portion of the slide which is movable there along;
   wherein the bearing is a solid, formed in the bearing space while in liquid state; and
   an actuator assembly spaced apart from the bearing;
   wherein the actuator assembly moves the slide between first and second positions.

2. The formed slide bearing assembly of claim 1, further comprising an impact member attached to the slide.

3. The formed slide bearing assembly of claim 2, wherein the impact member comprises an impact surface configured to receive an impact force.

4. The formed slide bearing assembly of claim 3, wherein the impact surface is oriented in tandem with at least a portion of the bearing and wherein the bearing is configured to receive the impact force.

5. The formed slide bearing assembly of claim 3, wherein the impact surface is oriented askew to at least a portion of the bearing and wherein the bearing is configured to receive the impact force.

6. The formed slide bearing assembly of claim 1, wherein the bearing is configured to receive an impact force external of the housing.

7. The formed slide bearing assembly of claim 1, wherein the bearing is a resilient bearing.

8. The formed slide bearing assembly of claim 1, wherein the housing comprises at least one opening to receive a portion of the bearing when in liquid state to assist securing the bearing to the housing.

9. The formed slide bearing assembly of claim 1, further comprising an impact member oriented in tandem with at least a portion of the slide and at least a portion of the bearing wherein the force of the impact is directed to the bearing.

10. A formed slide bearing assembly comprising:
    a housing having a longitudinal extent and having a bearing space formed along the longitudinal extent;
    a slide disposed within the bearing space of the housing and movable along its longitudinal extent; and
    a bearing formed in the bearing space between the housing and the slide;
    wherein at least a portion of the bearing forms the contour of at least a portion of the slide which is movable there along;
    wherein the bearing is a resilient material and configured to mitigate effects from an impact force exerted on the slide; and
    an actuator assembly coupled to the slide to move the slide between first and second positions;
    wherein the bearing absorbs any impact force applied to the slide rather than the actuator.

11. The formed slide bearing assembly of claim 10, further comprising an impact member attached to the slide.

12. The formed slide bearing assembly of claim 11, wherein the impact member comprises an impact surface configured to receive an impact force.

13. The formed slide bearing assembly of claim 12, wherein the impact surface is oriented in tandem with at least a portion of the bearing and wherein the bearing is configured to receive the impact force.

14. The formed slide bearing assembly of claim 12, wherein the impact surface is oriented askew to at least a portion of the bearing and wherein the bearing is configured to receive the impact force.

15. An impact assembly comprising:
a housing having a longitudinal extent and having a bearing space formed along the longitudinal extent;
a slide disposed within the bearing space of the housing and movable along its longitudinal extent;
a bearing formed in the bearing space between the housing and the slide; and
an impact plate coupled to the slide and configured to receive an impact member;
wherein an impact against the impact member causes the slide to exert a force against the bearing; and
wherein the bearing is configured to absorb the force from the slide.

16. The impact assembly of claim 15, wherein the impact member is oriented askew to at least a portion of the bearing.

17. The impact assembly of claim 15, wherein the impact plate is oriented in tandem with at least a portion of the bearing.

18. The impact assembly of claim 15, wherein the impact member is oriented in tandem with at least a portion of the slide.

19. The impact assembly of claim 18, wherein the impact member is attached to the slide.

20. The impact assembly of claim 19, wherein the impact member is formed integral with the slide.

* * * * *